United States Patent [19]
McNertney

[11] Patent Number: 5,864,984
[45] Date of Patent: Feb. 2, 1999

[54] SYSTEM AND METHOD FOR MEASURING SEEDLOT VIGOR

[75] Inventor: David C. McNertney, South Haven, Minn.

[73] Assignee: Paradigm Research Corporation, South Haven, Minn.

[21] Appl. No.: 491,397

[22] Filed: Jun. 19, 1995

[51] Int. Cl.$^6$ ............................. A01C 1/00; A01C 1/02
[52] U.S. Cl. ................................... 47/1.01; 47/58; 47/14; 382/110
[58] Field of Search ................................ 47/58, 1.01, 14; 382/110

[56] References Cited

U.S. PATENT DOCUMENTS

| | | | |
|---|---|---|---|
| 3,852,914 | 12/1974 | Levengood | 47/58 |
| 5,073,503 | 12/1991 | Mee | 436/147 |

OTHER PUBLICATIONS

Pansy Vigor Trial Information, including letters, memos, receipts and raw data, (earliest indicated date May 14, 1994).
Ball Seed Co., Ball Vigor Index—". . . but I don't grow plugs in a petri dish!", 1 pages, fax dated May 11, 1995.
"New Computer Imaging System Rates Seed Vigor", *GrowerTalks*, 12, 1 page, dated Dec. 1994.
Ball Seed Co., ". . . So, how many usable seedlings will you have?", 1 page, dated Apr., 1995.
Letter from Dave McNertney to Ron Wagner regarding sample of test results from the Paradigm seedlot vigor test system, 4 pages, dated Mar. 27, 1995.
Dave McNertney, "Seedlot Vigor Characteristics of 20 impatiens Seedlots", pp. 1–29, dated Mar. 27, 1995.
McCormac et al. A modified slant board test for vigour testing brassicas. Plant Varieties and Seeds, 3, 81–87, 1990.
McCormac et al. Automated vigour testing of field vegetables using image analysis. Seed Science and Technology, 18, 103–112, 1990.
Tagliavini et al. Measuring root surface area and mean root diameter of peach seedlings by digital image analysis. Hortscience, 28, 1129–1130, 1993.
Keys et al. Automated seedling length measurement for germination/vigor estimation using a CASAS (computer automated seed analysis system). Journal of Seed Technology. vol. 9, pp.40–53, 1984.
Trawatha et al. Laboratory vigor tests used to predict pepper seedling field emergence performance. Crop Science. Vo. 30. pp. 713–717, 1990.

*Primary Examiner*—Douglas W. Robinson
*Assistant Examiner*—Melissa L. Kimball
*Attorney, Agent, or Firm*—Schwegman, Lundberg Woessner, and Kluth, P.A.

[57] ABSTRACT

A machine vision system for determining seedlot vigor comprising an imaging device oriented to acquire an image of a germinating seed and an image analyzer for analyzing successive images of a seed and determining growth rate for a root of the seed, to determine the vigor of a seedlot to which the seed belongs. This system determines seedlot vigor independent of environmental germination conditions, measures a parameter which correlates highly with the characteristic of interest, and employs an appropriate experimental design, including sample size and test replication in order to insure that test results match actual final stands obtained from normal commercial production.

7 Claims, 36 Drawing Sheets

SYSTEM AND METHOD FOR MEASURING SEEDLOT VIGOR

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

TECHNICAL FIELD OF THE INVENTION

The present invention pertains generally to agriculture, and more particularly to systems and methods for assessing seedlot vigor.

BACKGROUND OF THE INVENTION

Seedlot vigor is the percentage of viable seeds within a given seedlot that possess sufficient growth potential to successfully progress through plant emergence under normal germination environmental conditions. Seedlot vigor is thus the percentage of seeds within a seedlot that possess the potential to become marketable plants. All other factors considered, this represents the maximum stand a seedlot can be expected to produce.

Seedlot vigor is often tested using plug trays. A plug tray consists of a series of small cells for sowing seeds typically for fruits, vegetables, and ornamental plants. An accurately sown crop in a plug tray consists of having exactly one seed per cell with good seed placement in each cell which contains adequate quality plug media. There are four stages through which a seed can progress in a plug tray. Stage 1 starts at the point when a seed has been sown, and ends when a radicle, i.e. embryonic root of a seedling, emerges from the seed coat. Stage 2 continues until emergence of the actual plant from the media. Stage 3 covers the growing of the plant until the plant is ready for sale. Stage 4 occurs during the time when a plant is being "finished" or hardened. Assuming a crop has been accurately sown, the final stand of marketable plants expected in a plug tray is dependent in large part on two factors: Seedlot vigor and environment.

An adequate environment must be provided to realize the maximum stand potential of a given seedlot. This includes proper levels of light, temperature, nutrition, water and gases. Additional cultural practices including chemical selection, application, and so forth, must also be managed in a logical and efficient manner.

In the past, the determination of seedlot vigor has been considered inconsistent and unreliable. The accepted seed testing standard set by the American Organization of Seed Analysts (AOSA) involves placing a prescribed number of seeds on blotter paper in a controlled environment for a certain length of time. By providing a controlled, standardized environment during the germination process, concerns with environment are reduced to a minimum. The final data obtained from this system consists of subjective counts of good seedlings collected at specified times.

As subjective counts are often found to be inaccurate, plug producers have turned to plug tray tests to measure the percentage of seeds within a seedlot capable of becoming marketable plugs, i.e. the final stand potential of a seedlot. One common goal of both the plug tray and blotter paper tests is to avoid having to identify the actual cause of poor vigor and just determine the percentage of seeds within a given seedlot which are satisfactory for use in commercial production. An in-house plug tray is generally able to distinguish between seedlots in a specific location which are capable of producing a final stand greater than 90%, for example, from those not likely to surpass 80%. However, even a well-replicated plug test cannot be expected to reliably predict final plug stands due to normal variation in cultural practices and germination environment. The plug tray test, however, has gained much acceptance because it automatically screens out the lowest vigor seeds because they simply do not emerge.

One problem with the plug tray test is that it cannot distinguish between seedlot vigor and germination environment. For example, if a given seedlot produces an 80% final stand, it does not necessarily follow that this seedlot possesses a total stand potential of 80%. It is possible for more than 80% of the seeds within this seedlot to have adequate vigor, but due to environmental problems, the final stand is only 80%. In addition, plug tray tests require expensive facilities and are labor and time consuming, often requiring 21 to 28 days for completion.

Another commonly used method involves the use of a stress test, in which it is presumed that if a seed can germinate satisfactorily under less than ideal conditions, it should be considered vigorous. One shortcoming with this approach, whether conducted on blotter paper or in a plug tray, is that stress tests have been found to be unreliable. One repercussion of testing seeds in conditions significantly different from normal production is often very inconsistent results.

Systems trying to exploit factors related to seed composition, such as levels of protein, ATP or RNA synthesis and chromosome or membrane degradation have encountered similar inconsistencies. A common characteristic of these tests is an attempt to isolate one component from a very complicated biochemical process. The hypothesis is that this one narrow factor changes in direct proportion with the ability of a seed to produce a marketable plug. Such biological systems, however, are generally too complex to allow such narrow tests to consistently and reliably predict such a general outcome.

Commercial plug production has essentially become a manufacturing process with growers facing ever-increasing demands to maximize the final stand of marketable plugs in each plug tray as efficiently as possible. Financially, seed is a major production input and seed vigor directly affects final stand.

Thus, what is needed is an efficient and economical method and apparatus which utilizes appropriate environmental conditions, measures a parameter which correlates highly with the characteristic of interest, and employs an appropriate experimental design, including sample size and test replication in order to insure that test results match actual final stands obtained from normal commercial production.

SUMMARY OF THE INVENTION

The present invention takes advantage of the consistency and repeatability inherent with a blotter paper test plus incorporates the collection of objective data concerning root emergence and radicle growth and development. This system thus exploits a very simple concept: That more vigorous seedlings grow faster.

The present invention provides a machine vision system for determining seedlot vigor comprising an imaging device oriented to acquire an image of a germinating seed and an image analyzer for analyzing successive images of a seed and determining growth rate for a root of the seed, to determine the vigor of a seedlot to which the seed belongs.

The present invention also provides a method for determining seedlot vigor comprising the steps of:

(a) acquiring a first image of each seed;
(b) acquiring one or more additional images of the root at times later than first image; and
(c) measuring growth rate of each germinated seedling by electronic image analysis to determine seedlot vigor.

In one embodiment of the present invention a rotating rack system containing a plurality of germination boxes (in one embodiment, 198 germination boxes are used) is placed inside an environmentally-controlled growth chamber. An imaging device such as a digital camera is positioned using a camera positioning system so that it can obtain a image of one germination box at a time. The germination boxes contain blotter paper which can be arranged according to the standards for blotter paper tests set forth by the American Organization of Seed Analysts (AOSA). Such standards include testing four replications of 100 seeds per each germination box, specific light and temperature levels, and so forth. In a preferred embodiment of the present invention, only about 20 seeds are plated ("plated" refers to placing seeds on blotter paper, as opposed to being planted in a growth medium) on the blotter paper in each of twelve (12) germination boxes for any given seedlot, for a total of about 240 seeds.

The rotating rack system consists of a frame onto which several rotating racks are mounted. The rotating racks are supported by and rotated with chains such that the rotating racks remain horizontal during rotation, similar to the motion of a ferris-wheel. The rotating rack system is powered by a motor located just outside the growth chamber.

The camera positioning system is completely enclosed with a sheet metal box, and is bolted to the inside of the sheet metal box which is mounted to the top of the growth chamber. The camera positioning system includes a carriage onto which the digital camera is secured. The carriage is moved back and forth by the action of a pneumatic air cylinder, allowing the digital camera to be positioned over any one of the germination boxes located on the uppermost rotating rack inside the growth chamber. The germination boxes are exposed to the digital camera lens through a large opening, or slot, in the top of the growth chamber.

The digital camera captures, rotates if necessary, and then saves a image of an overall region of interest (ROI) for an individual germination box. An image of a germination ROI for each individual seed within the individual germination box is thus included, with subsequent images obtained every day to monitor root growth within successive new measurement ROI's. The images are saved in an image database wherein the path of each root, including the root's end point is noted. Every seed within every individual germination box can be monitored for root growth in this way, or only specifically desired germination boxes and/or individual seeds within each germination box can be monitored.

The saved image is then analyzed using an image analyzer, preferably a personal computer with seedlot vigor analysis software executing thereon. The seedlot vigor analysis software can detect and flag data for any root measurement which is outside of an expected range. The flagged data is examined manually and corrected. This correction can include providing an accurate root measurement by manually drawing a line with a pointing device such as a mouse, corresponding to the correct root position over the top of the image in question. The personal computer stores the length and position of this line in the image database.

Alternatively, the correction can include eliminating data from the database manually. Data may need to be eliminated for a number of reasons, such as when a fungus has engulfed the root. In such cases, the data up to the point just prior to the engulfment of the root remains in the database. The data is then further analyzed and a report is generated regarding seedlot vigor of each seed which has been plated and which has not been eliminated from the database.

The invention is also a basic non-machine implemented method of measuring the rate of root growth. The rate of root emergence and radicle growth and development for each seed which has been plated on the blotter paper can be hand-measured, and a report regarding seedlot vigor can be generated manually.

The seedlot vigor measurement system of the present invention offers both seed vendors and consumers a quick, reliable and accurate method of determining the final stand potential for any given seedlot.

These and other features, aspects, and advantages of the present invention will become better understood with regard to the following description, example, appended claims and accompanying drawings.

DETAILED DESCRIPTION OF THE INVENTION

The present invention provides a method and system for determining seedlot vigor independent of germination environmental conditions. The consistent achievement of a particular final marketable plug stand requires the use of seedlots that possess adequate final stand potential. In order for a system to accurately and reliably determine this potential, it must identify results due to seedlot vigor independent from effects related to germination environmental conditions.

The unique ability of the process and apparatus of the machine vision system of the present invention to operate within these constraints distinguishes this system from other commercially available systems purporting to measure seedlot vigor. Specifically, these other systems do not determine seedlot vigor independently from the effects related to germination environmental conditions, and so cannot accurately and reliably determine final stand potential.

Figure 1:
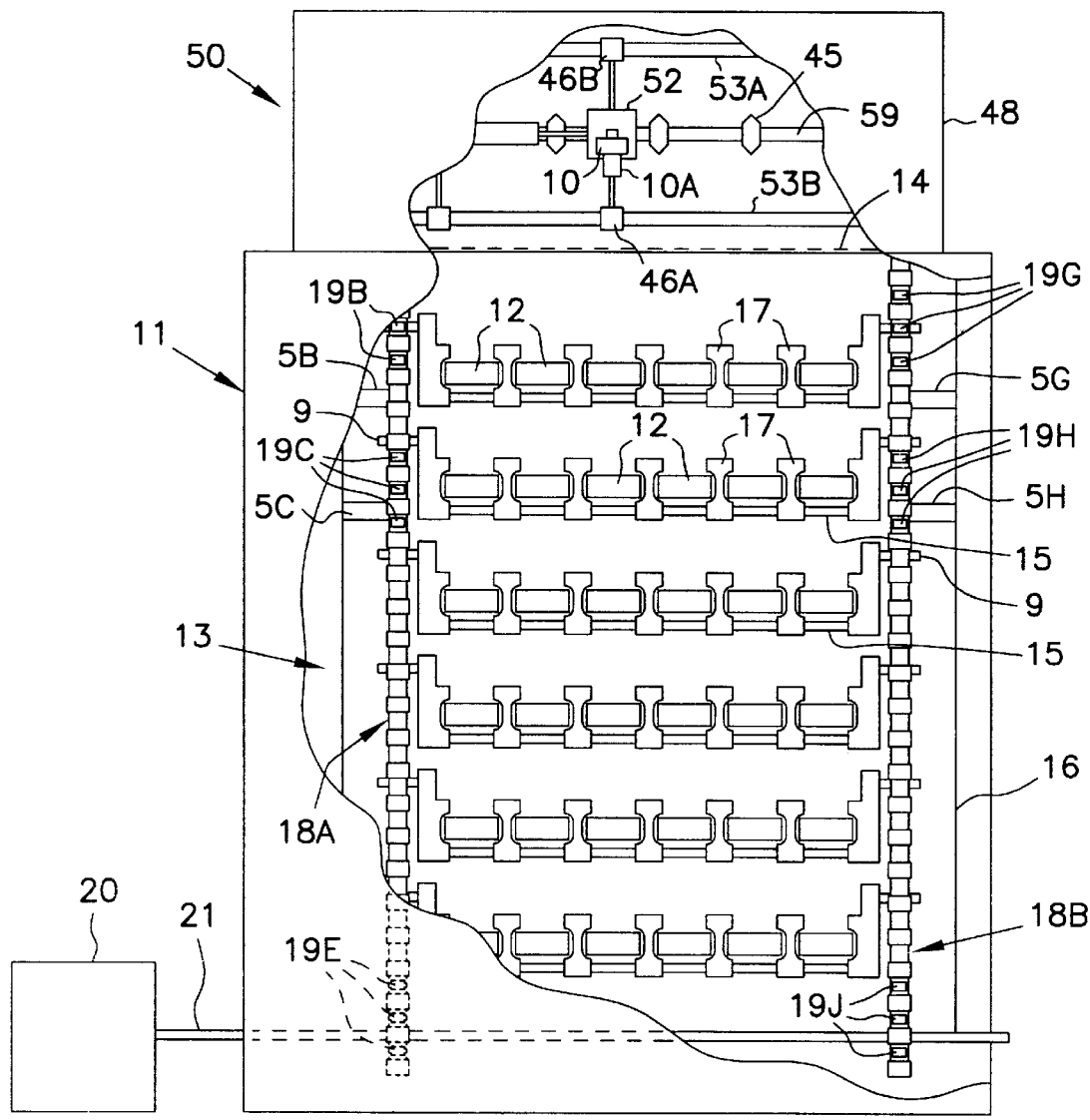
FIG. 1 is a schematic diagram showing a cut-away front view of a preferred embodiment of an enclosed camera positioning system and growth chamber of the present invention.

Referring to FIG. 1, an imaging device, preferably a camera 10 is positioned above the top of an environmentally-controlled growth chamber 11 so that it can obtain a captured image of one germination box 12 at a time. The imaging device can be any one of a number of devices including ultrasound, MRI, X-ray, and so forth. More preferably the camera 10 is a video camera, and most preferably a digital camera. In a preferred embodiment, a Sony DXC-151 digital camera and Navitron Zoom 7000 18-to-100 mm zoom lens is used. The lens is most preferably maintained at a distance of about 33 cm from the top of the germination box 12 being viewed. In one embodiment, the growth chamber 11 is about 76 cm wide, about 56 cm deep and about two (2) m high.

All of the germination boxes 12 are located on a suitable tray or rack system, preferably a rotating rack system 13 which is placed inside the growth chamber 11. The environmental conditions within the growth chamber 11 can be in compliance with AOSA standards for blotter paper tests. Such standards include specific light and temperature levels, specific time periods for testing, and so forth. For example, the AOSA prescribed temperature for impatiens testing is about 25±1° C., lighting level is at a photosynthetic photon flux (PPF) of about 100 $\mu molm^{-2}s^{-1}$ for a time period of 12 hours each day.

Preferably the growth chamber 11 has an opening, or slot 14 on the top which exposes the top rotating rack 15 of the rotating rack system 13 allowing a image to be captured by the camera 10. More preferably, the slot 14 is about ten (10) cm wide and is about the same length as the rotating racks 15 in the rotating rack system 13. In one embodiment, the slot 14 is about 70 to 75 cm in length.

Preferably the camera 10 is positioned with a camera positioning system 50. More preferably the camera positioning system 50 is enclosed by a sheet metal box to assure that controlled environmental conditions are maintained within the growth chamber 11. The camera positioning system 50 can be mounted to the sides of the sheet metal box 48 which in turn is mounted to the top of the growth chamber 11. The camera 10 can obtain a captured image of one germination box 12 at a time.

Figure 2:
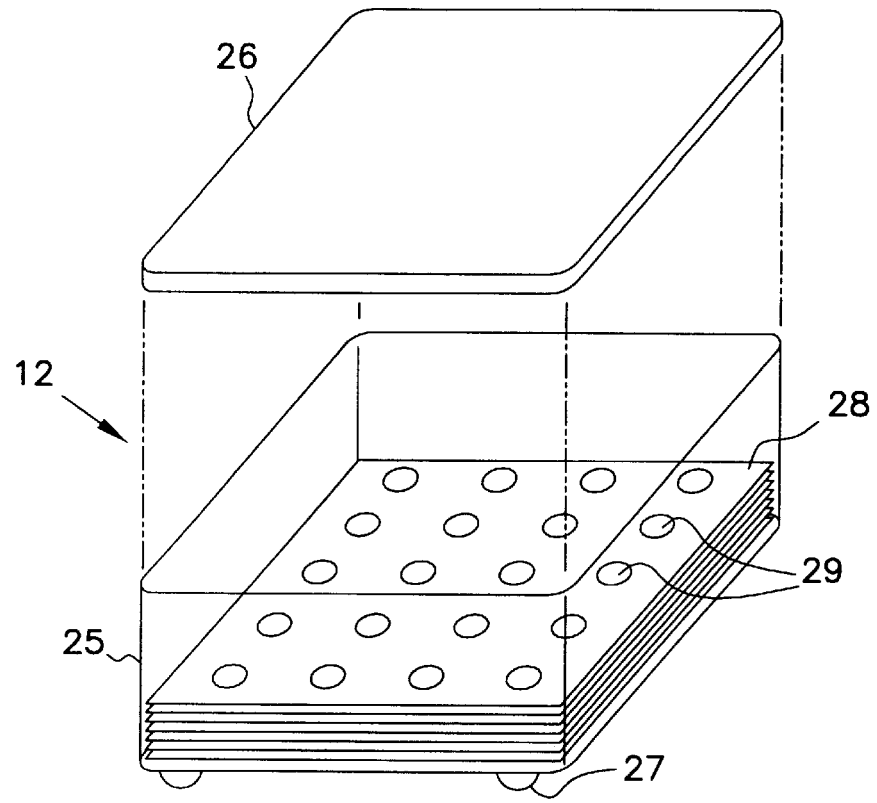
FIG. 2 is a perspective view of a preferred embodiment of a germination box of the present invention.

Referring to FIG. 2, a detailed view of a germination box 12 is shown. The germination box 12 is preferably a standard seed industry germination box which includes a container 25 and a lid 26. The container 25 and lid 26 are both made from a clear scratch-resistant acrylic material which is about 3 mm thick. The container 25 has smooth sides, rounded corners, and is preferably about 11×11×four (4) cm. Protrusions 27 on the bottom of the container 25 facilitate stacking of the containers 25 for storage. The lid 26 snaps over the top of the container 25 to form a tight-fitting enclosure.

Blotter paper 28 is layered inside the germination box 12. Preferably, about seven layers of ten (10)×ten (10) cm blotter paper 28 are used which have a total thickness of about three (3) mm. More preferably, the AOSA standards for type, amount, and arrangement of blotter paper are used for the particular seed type being tested. This standard typically requires two layers of Blue Anchor germination blotter paper to be placed over five layers of Kimpac seed germination paper with seeds 29 plated on top of the uppermost layer of blotter paper 28 after the blotter paper 28 has been wetted with a suitable fluid, preferably distilled water. The AOSA standard, however, can vary from this particular arrangement, depending on the seed type being tested. Alternatively, any suitable type, amount, and arrangement of blotter paper 28 can be used. For example, for seeds with a longer germination time, such as turf grass, several more layers of Kimpac seed germination paper can be used to absorb more fluid.

Figure 2A:
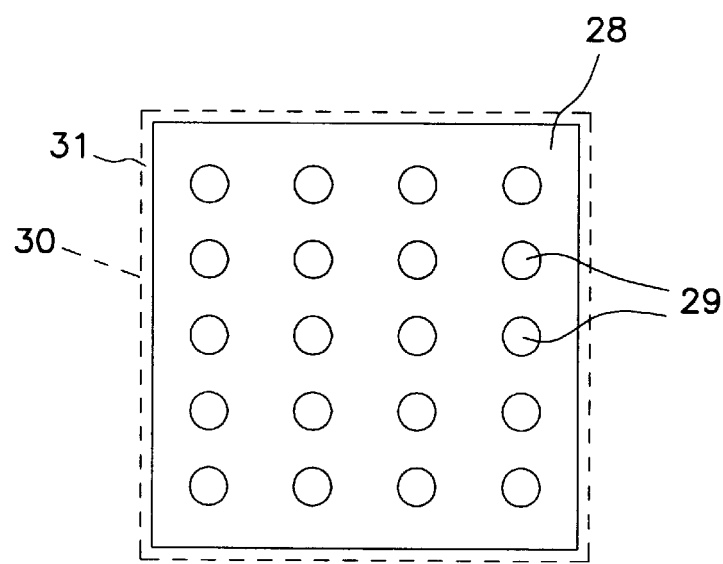
FIG. 2A is a schematic diagram of a preferred embodiment of an arrangement of plated seeds with the present invention.

The placement of a preferred arrangement of plated seeds 29 is shown in FIG. 2A. In this embodiment, twenty (20) seeds 29 are plated in a four (4)×five (5) pattern on the top layer of blotter paper 28. Preferably, twelve (12) replications are used for each seedlot for a total of 240 seeds tested. This is less than the AOSA standard of four (4) replications of 100 seeds per each germination box for any given seedlot for a total of 400 seeds. Fewer seeds can be used in the present invention because of increased statistical precision: whereas the AOSA standard calls for 4 observations on 100 seeds each, the present invention can collect 240 observations, because growth of individual seeds are tracked, rather than counting of germinations of groups of seeds as groups.

Preferably, AOSA standards are otherwise followed for plating seeds. This includes adding a quantity of fluid, preferably distilled water, to the blotter paper 28 in the germination box 12 just prior to plating, and then orienting the germination box 12 vertically for a time sufficient to allow excess liquid to drain, preferably about 60 seconds. After plating the seeds 29 on the blotter paper 28, the lid 26 of the germination box 12 is placed on top of the container 25.

Referring again to FIG. 1, the germination boxes 12 rest on rotating racks 15 which are supported by a frame 16. The frame 16 is the outermost portion of the rotating rack system 13. Any suitable number of germination boxes 12 can be placed on each rotating rack 15. A germination box holder 17 is located between each germination box 12. Preferably the germination box holders 17 are plastic and are designed to accommodate the rounded corners of the germination boxes 12 and so that the germination boxes 12 remain stationary after being placed between two adjacent germination box holders 17. In one embodiment there are about six (6) germination boxes 12 on each rotating rack 15, and about 37 to 38 rotating racks supported by the frame 16. For simplicity, FIG. 1 shows six (6) germination boxes on each rotating rack and six (6) rotating racks, although any suitable number of germination boxes and rotating racks can be used.

The rotating racks 15 can be supported with and rotated by any suitable mechanism. The rotating racks 15 are preferably supported with and rotated by two (2) chains, 18A and 18B, such that the rotating racks 15 remain horizontal during rotation, similar to the motion of a ferris-wheel. Chains 18A and 18B are mounted on swivels 9, which are located on both ends of each rotating rack 15. Furthermore, chains 18A and 18B are each guided by suitable chain guiders.

Preferably, the two chains, 18A and 18B are each guided by a set of five (5) sprockets. Idler sprockets 19A, 19B, 19C, 19D, and drive sprocket 19E, are the sprockets for chain 18A. (See also FIG. 3). Idler sprockets 19F (not shown), 19G, 19H, and 19I(not shown) and drive sprocket 19J are the sprockets for chain 18B. All of the eight (8) idler sprockets (four (4) for each chain 18A and 18B) are attached to frame 16 with suitable sprocket supports 5A–5D for chain 18A (See FIG. 3) and 5F–5I for chain 18B (not all shown).

FIG. 1 shows two (2) of the idler sprockets 19B and 19C for chain 18A, supported with idler sprocket supports 5B and 5C, respectively. The idler sprocket supports 5B and 5C are attached to frame 16. Also shown are two (2) of the idler sprockets 19G and 19H for chain 18B, supported with idler sprocket supports 5G and 5H, respectively. The idler sprocket supports 5G and 5H are also attached to frame 16.

Drive sprockets 19E and 19J are both mounted on shaft 21 which enters the growth chamber 11 on one side near the bottom of the rotating rack system 13, and exits on the opposite side. Shaft 21 is connected to a motor 20 which powers the rotating rack system 13. The motor 20 is located just outside the growth chamber 11.

Figure 3:
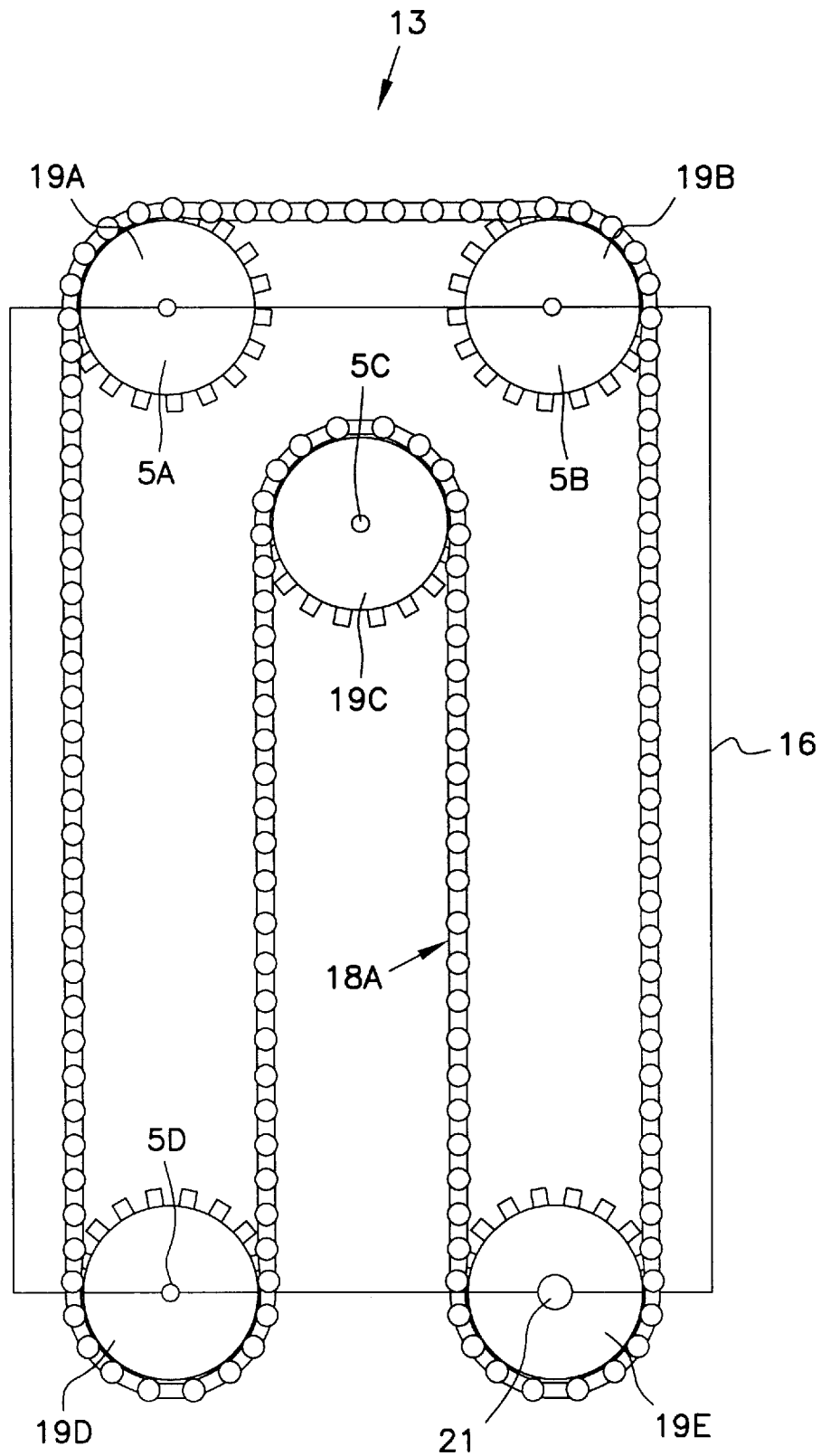
FIG. 3 is a schematic diagram showing a side view of a preferred embodiment of a rotating rack system of the present invention.

FIG. 3 shows a side view of a preferred embodiment of the rotating rack system 13. As discussed above, chain 18A is guided by four idler sprockets 19A, 19B, 19C, and 19D, which are rotatably mounted to the frame 16, and one driver sprocket 19E, mounted to shaft 21. More preferably, chains 18A and 18B are #35 chains having two (2) cm links, and the idler sprockets and driver sprockets are #35B45 sprockets, each having a pitch diameter of about 13.5 cm and mounted as described above.

The camera positioning system 50 can be any system capable of moving a camera such that images can be obtained of each germination box 12. The camera positioning system 50 can be computer-controlled or can be controlled by hand. In one embodiment of the invention, the camera positioning system 50 can be a computer-controlled single axis x-y positioning table.

Figure 4:
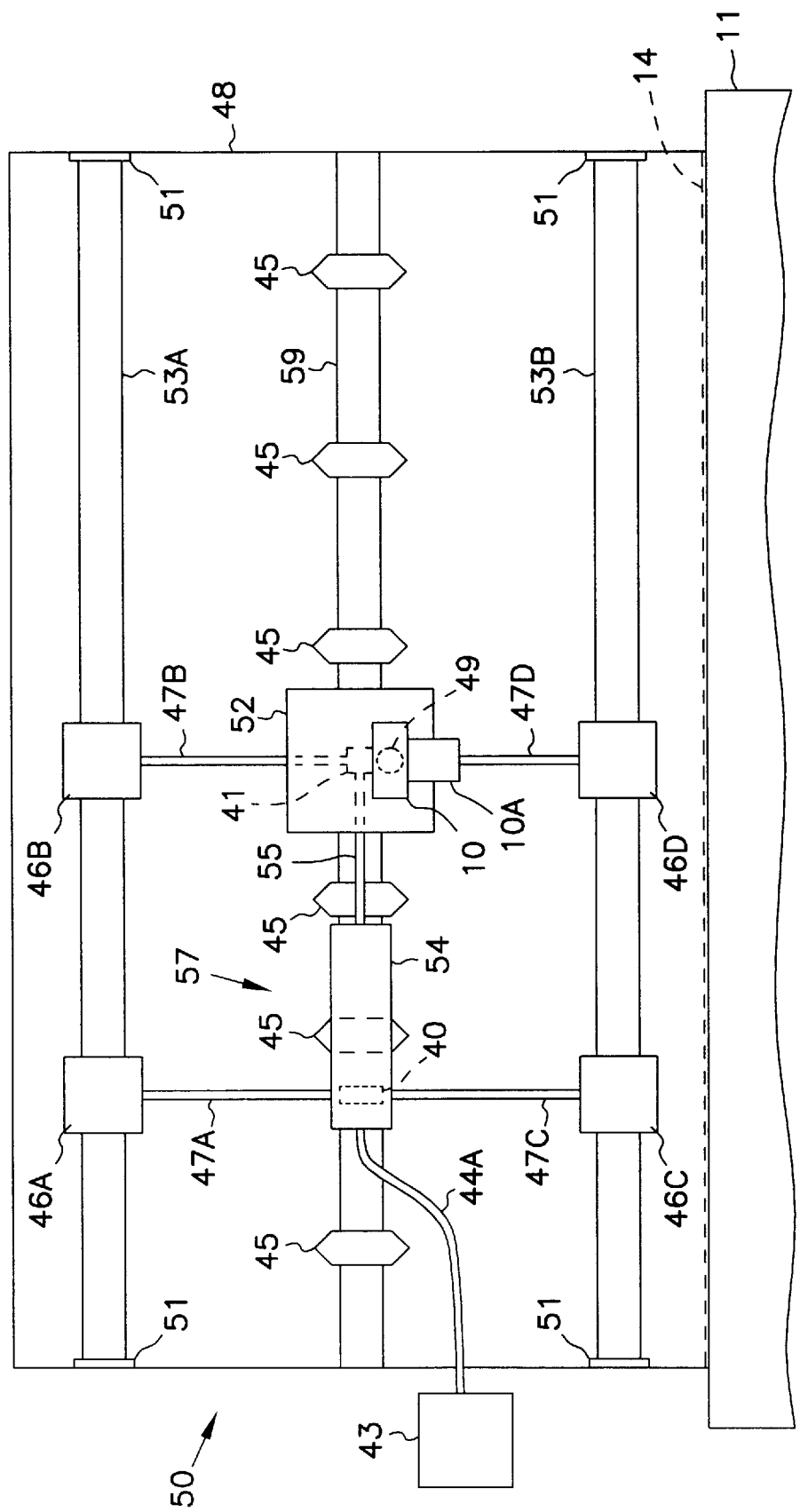
FIG. 4 is a schematic diagram showing a side view of a preferred embodiment of the camera positioning system of the present invention.

Referring to FIG. 4, a preferred embodiment of a front view of a computer-controlled camera positioning system 50 is shown. The camera positioning system 50 is preferably attached to a sheet metal box 48 with bolts 51 to secure the ends of drill rods 53A and 53B to the sides of the sheet metal box 48. The camholder rod 59 can also be attached to sheet metal box 48. More preferably the sheet metal box 48 is enclosed on the top and four sides, and is connected to the top of the growth chamber 11 so that the growth chamber 11 and sheet metal box 48 are completely enclosed, and so that the slot 14 in the top of the growth chamber 11 opens to the inside of the sheet metal box 48.

An air cylinder 57 is centered between and can be in the same vertical plane as drill rods 53A and 53B. The air cylinder 57 is preferably a Bimba air cylinder and is comprised of an air cylinder body 54 about fifteen (15) cm in length and a piston 55 which can extend and contract out of one end of the air cylinder body 54. The piston 55 preferably has a diameter of about 0.5 cm and a stroke of about 11.5 cm.

Figure 5:
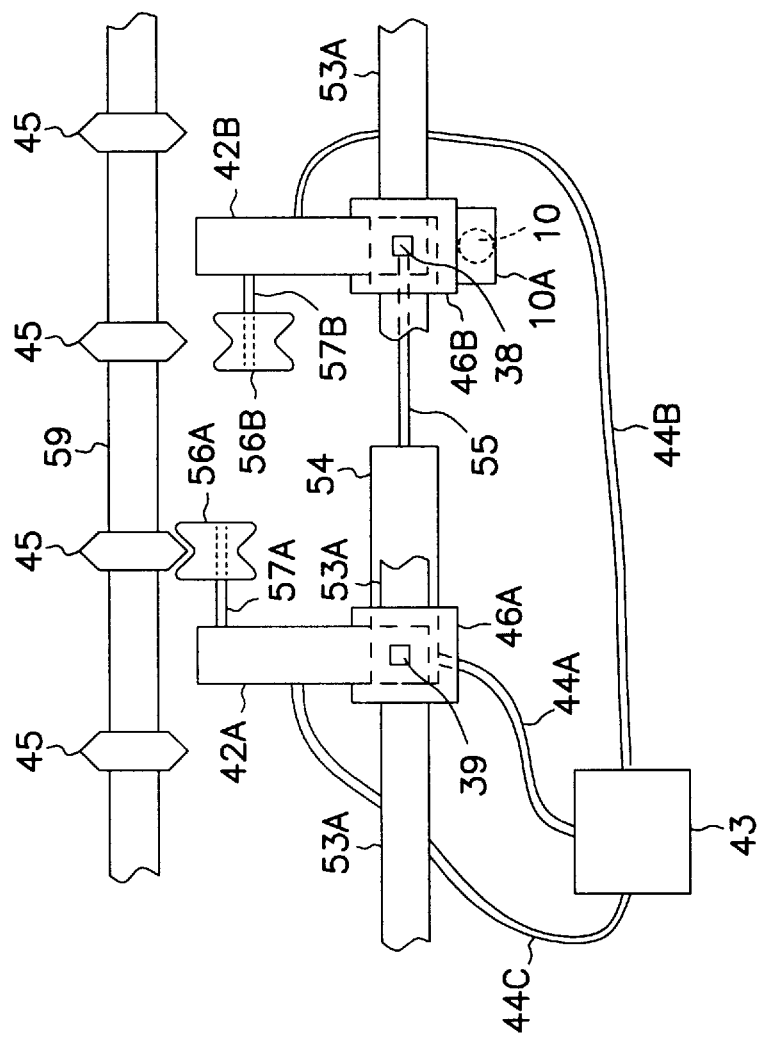
FIG. 5 is a schematic diagram showing a portion of the top view of a preferred embodiment of the camera positioning system of the present invention.

As shown in FIG. 5, a preferred embodiment of a portion of the top view of the computer-controlled camera positioning system 50, the end of the piston 55 is connected to pneumatic rotary actuator 42B with a first actuator connector 38, which allows the piston to be guided by cam 56B. The end of the air cylinder body 54 furthest from the piston is connected to pneumatic rotary actuator 42A with a second actuator connector 39, which allows the air cylinder body 54 to be guided by cam 56A.

Referring again to FIG. 4, the air cylinder body 54 is connected to two pieces of metal stock 47A and 47C by a first metal stock connector 40. The two pieces of metal stock 47A and 47C also connect bushings 46A and 46C, respectively. The air cylinder body 54 is also coupled to a pressurized air supply 43 along line 44A as shown. The force of pressurized air causes the piston 55 in the air cylinder 57 to extend, and the release of pressurized air allows the piston 55 to contract.

Preferably, camera 10 with camera lens 10A is connected to carriage 52 with a suitable bolt 49. The bottom of the carriage 52 is connected to a second metal stock connector 41 which also joins together two pieces of metal stock 47B and 47D. The second metal stock connector 41 is also connected to the end of piston 45. The two pieces of metal stock 47B and 47D, connect bushings 46B and 46D, respectively.

Bushings 46A and 46B slide back and forth on drill rod 53A, and bushings 46C and 46D slide back and forth on drill rod 53B. Preferably drill rods 53A and 53B are in the same vertical plane and are constructed from polished steel, designed to allow the four bushings 46A, 46B, 46C, and 46D to slide smoothly along their surfaces.

A cam holder rod 59 is centered between drill rods 53A and 53B, but is not in the same vertical plane as drill rods 53A and 53B. The cam holder rod 59 supports preferably about seven (7) cam holders 45 spaced about 11.5 cm apart.

As shown in FIG. 5, the cam holders 45 are used to engage cams 56A and 56B located on rods 57A and 57B, respectively. Rods 57A and 57B are further coupled to the pneumatic rotary actuators 42A and 42B, respectively. As previously discussed, pneumatic rotary actuator 42B is connected to the end of the piston 55 with first actuator connector 38 and pneumatic rotary actuator 42A is connected to the air cylinder body 54 at second actuator connector 39. The pneumatic rotary actuators are used to rotate cams 56A and 56B up and down 90°, and are each supplied with pressurized air supply 43 along lines 44B and 44C, respectively.

The action of the piston 55 extending and contracting from the air cylinder 52 allows the two (2) cams 56A and 56B to be alternately rotated 90° up and down. When in the down position, a cam (56A or 56B) can engage in the grooves of one of the cam holders 45, causing it to be locked into position. When in the up position, a cam (56A or 56B) does not engage one of the cam holders 45, allowing it to be slid along the cam holder rod 59 for a distance of about 11.5 cm, i.e. until the next cam holder 45 is encountered. In this way, the linear movement of the air cylinder 57 causes the carriage 52 to travel over the top of the slot 14 so that a image of each germination box 12 (shown in FIG. 1) to be obtained by camera 10.

One example of this movement can start with the air cylinder 57 in a contracted position. Further, cam 56A, which guides the air cylinder body 54, can begin in the locked in the down position, i.e., engaged with a cam holder 45. Cam 56B, which guides the end of the piston 55, is therefore not engaged with a cam holder 45, and is in the up position and free to move:

1. When the piston 55 is extended, cam 56B is moved about 11.5 cm to the right, while cam 56A has remained locked in a cam holder 45, i.e. stationary.

2. Cam 56A is then rotated to the up or movable position, while cam 56B is rotated to the down or locked position.
3. When the piston 55 is contracted, cam 56A is moved about 11.5 cm to the right, while cam 56B has remained locked in a cam holder 45, i.e. stationary.
4. Cam 56A is then rotated to the down position, while cam 56B is rotated to the up position. (This is the position of the cams 56A and 56B shown in FIG. 5).
5. When the piston 55 is extended, cam 56B is moved again about 11.5 cm to the right, while cam 56A has remained stationary.

As a result of the above five steps, the air cylinder 57 has been moved about 23 cm to the right. As the end of the piston 55 is also connected to the same second connector 41 as is the carriage 52 on which the camera 10 is mounted, the camera has also been moved about 23 cm. Each movement of about 11.5 cm represents the distance between the center of each germination box 12. After the carriage 52 has travelled to preferably six (6) positions correlating with the six (6) germination boxes, it can remain in place until the next rotating rack 15 (see FIG. 1) is rotated to the top level, and then can operate in reverse to view each of the new six (6) germination boxes on the new top rotating rack 15. Alternatively, the camera positioning system 50 can be set up to operate on a random basis, or to view any particular germination box 12 desired.

Figure 6:
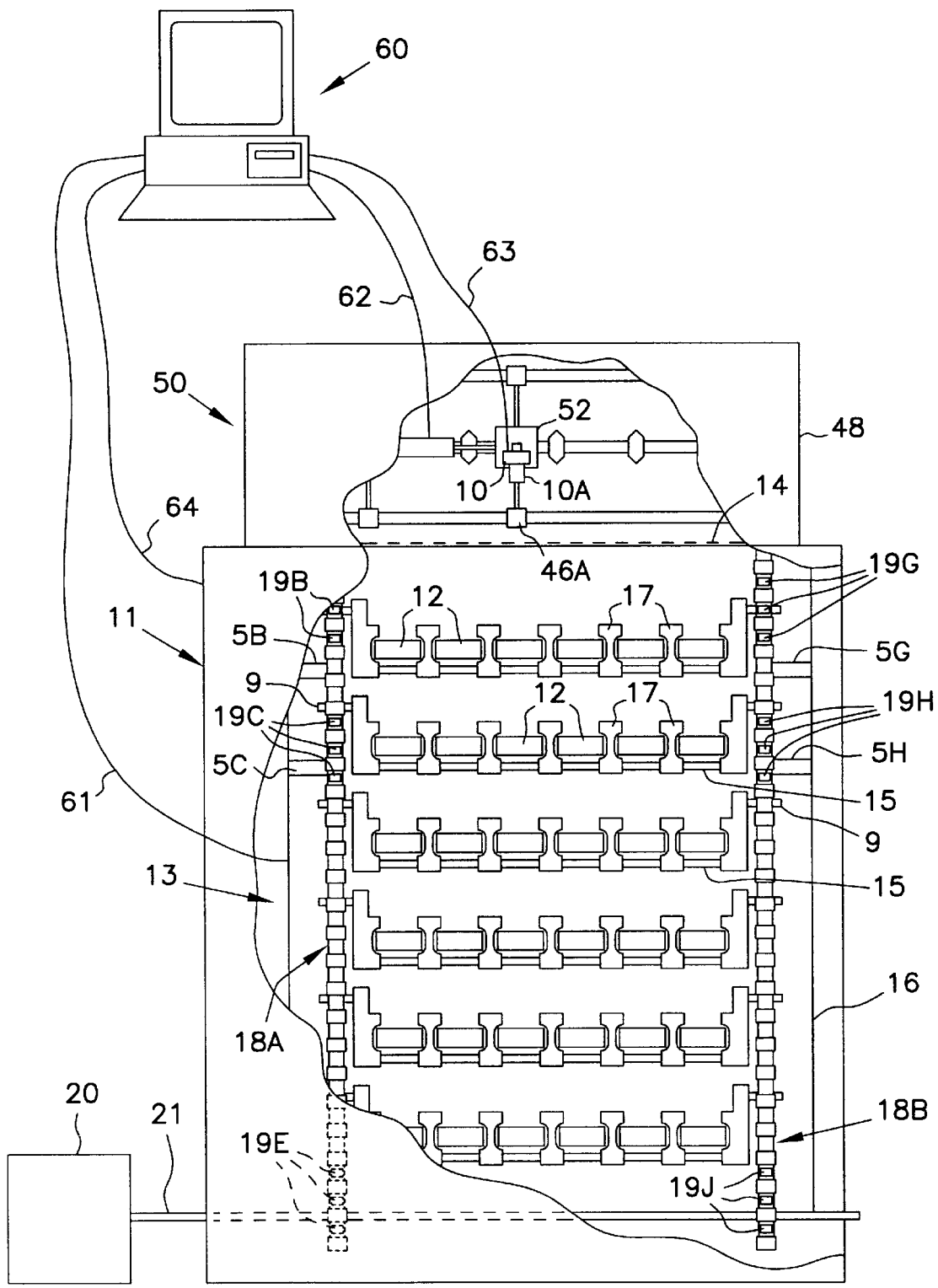
FIG. 6 is a cut-away view of a preferred embodiment of the growth chamber, rotating rack system, camera positioning system, and camera coupled to a personal computer of the present invention.

In a preferred embodiment, the image analyzer of the present invention is a personal computer 60 having software components executing thereon. FIG. 6 shows the camera positioning system 25, camera 10, rotating rack system 13, and growth chamber 11 coupled to a personal computer 60. The personal computer 60 is coupled to the camera positioning system with a camera positioning system control component 62 which controls the movement of the carriage 52 on which the camera 10 is secured. The personal computer 60 also has software executing thereon which has a camera control component 63 to control the movement of the camera 10. Further, the personal computer 60 is coupled to the rotating rack system 13 and has software executing thereon which has a rotating rack movement control component 61 to control the movement of the rotating racks 15. There is also a growth chamber environmental control component 64 which is coupled to the personal computer 60 which controls environmental conditions within the growth chamber 11.

Figure 7:
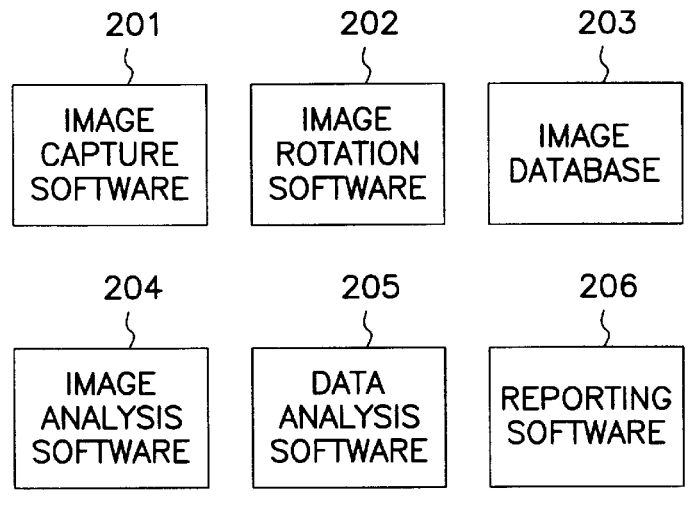
FIG. 7 is a listing of the basic software components which execute on the personal computer of the present invention to obtain, analyze, and report information pertaining to seedlot vigor.

FIG. 7 shows the seedlot vigor analysis software which executes on the personal computer 60 to obtain, analyze and report information pertaining to seedlot vigor. Preferably the software is Optimas, a standard imaging research tool which allows a researcher to customize the program to suit his or her particular needs. The software components include image capture software 201, image rotation software 202, an image database 203, image analysis software 204, data analysis software 205, and reporting software 206.

The image capture software 201 is used to obtain a captured image with the camera 10 as described herein. The image rotation software 202 preferably rotates, if necessary, the captured image to obtain a centered view of an overall region of interest (ROI). The overall ROI includes the blotter paper 28 and space 31 beyond the blotter paper, preferably about 0.5 cm, as described in FIG. 2.

Figure 8A:
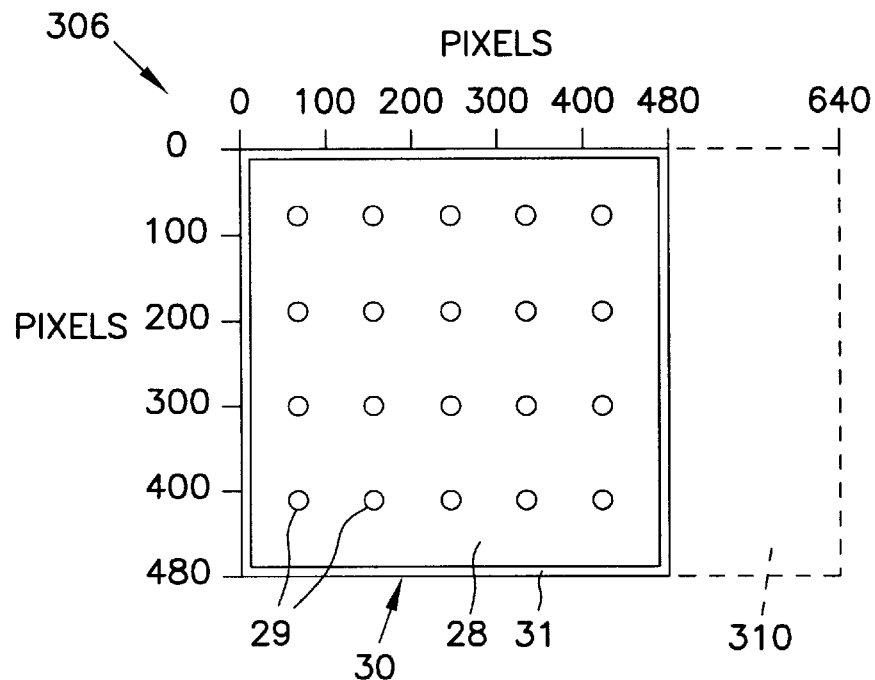
FIGS. 8A–8H are a series of diagrams illustrating the method of the present invention for obtaining successive images of a typical root growth pattern from Day 0 through Day 8.
Figure 8B:
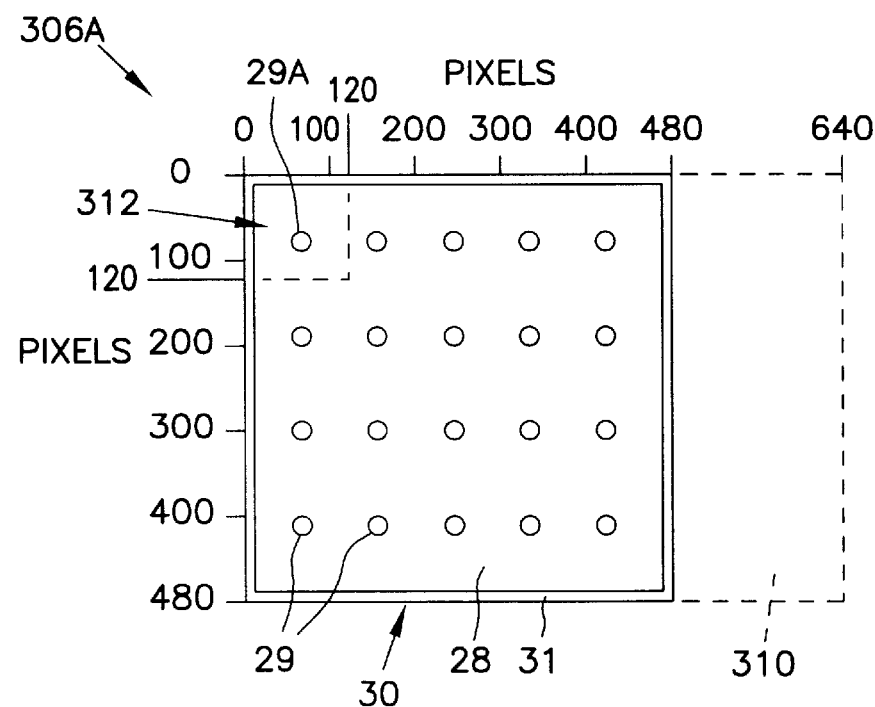

FIGS. 8A–8H are a series of diagrams illustrating the method of the present invention for obtaining and rotating a first captured image which includes the overall ROI 30 shown in FIG. 8A and FIG. 8B. The method further includes obtaining a seed ROI within which a particular seed is located, and obtaining successive captured images of the seed as it germinates so that the root growth, including root position and root endpoint, is followed. In this series of diagrams, 0:0 on the x:y axis is in the upper left-hand corner of the image, and a typical root pattern is shown for a test period encompassing Day 0 through Day 8.

FIG. 8A corresponds with Day 0, which is the day on which the seeds 29 are plated on the blotter paper 28 and placed in a germination box (12) in the manner previously described. Each captured image 306 is 640 by 480 pixels. As the blotter paper 28 and a small space 31 of about 0.5 cm around the blotter paper, form a square, there is a small area of unused space 310 on each captured image 306. Unused space 310 extends from 480 to 640 pixels on the x-axis and 0 to 480 pixels on the y-axis. The captured image 306 is rotated until the bottom of that image 306 (and thus the bottom of the ROI 30), and are used by the software to generate a horizontal angle of reference.

FIG. 8B corresponds with Days 0, 1, and 2, in which the captured image 306 is rotated on Day 0, if necessary, to form a rotated captured image 306A which is centered on the center point of the overall ROI 30. The overall ROI 30 comprises the blotter paper 28 with the twenty (20) plated seeds 29 and the small space 31 beyond the blotter paper 28 as previously described.

The rotation of the captured image occurs by the image rotation software 202 (See FIG. 7) finding a blue area of pixels corresponding to the blue blotter paper 28, wherein the frame of reference is the center of the blotter paper 28, or 0:0 along an x:y axis. In one embodiment, the software looks at top edge of the blue blotter, and rotates the image until that edge is horizontal. In another embodiment, the software then generates a line which is then "drawn" along the top edge of the blue pixels (or drawn by a user using a pointing device such as a mouse), which corresponds with the blotter paper 28. The angle of the line is calculated by the image rotation software 202 (See FIG. 7), and the captured image 306 is rotated until the angle is 0° with respect to the pre-determined frame of reference which is the center of the bottom of image 310. Although the small area 31 (which together with the blotter paper 28 comprised the overall ROI 30) remains present in the rotated captured image 306A, the pixels corresponding with the small area 31 are essentially "blacked-out" and not considered any further.

FIG. 8B further shows the identification of a seed ROI 312 within which a particular seed 29A is found. In this example, the seed ROI 312 is defined as including the space from the point 0:0 pixels to about 120:120 pixels. Individual seeds are located by searching for "seedlike" (i.e., proper size, shape and color) objects within the corresponding seed ROI 312 and saving the x:y coordinates of the center of each object found to the image database. The center of seed 29A itself is shown located at about 80:80 pixels. A similar seed ROI and seed location is found for each of the twenty (20) seeds 29 plated on the blotter paper 28. As seeds typically do not germinate until the third day after plating, the rotated captured image 306A does not change from Day 0 to Day 1 to Day 2. Further, any change in size or position of a seed due to germination is not considered significant in this analysis.

Figure 8C:
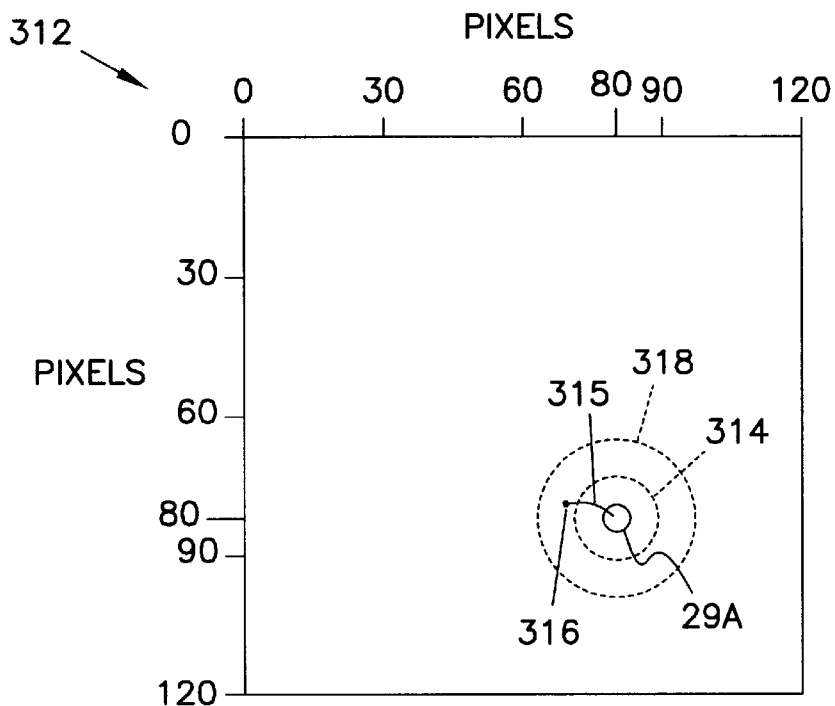

FIG. 8C corresponds with Day 3 and, for simplification, only the seed ROI 312 (120:120 pixels) in which seed 29A is found is considered further, although this analysis is applicable to any of the seeds 29 plated on any of the blotter paper 28. On Day 3, an initial germination ROI 314 is drawn around the center of the seed 29A, i.e. seed centroid, with a circle radius of about 2 mm greater than the radius of the seed, and is thus dependent on seed size. The presence of a root 315 within the initial germination ROI 314 are then determined. Thus all roots which are 2 mm long will touch the ROI 314 and thus that seed will be considered germinated.

In this example, the root 315 is touching the outer edge of the initial germination ROI 314, which indicates that germination has occurred. A first measurement ROI 318 is then drawn which is used for the initial measurement of the root 315 and the initial germination ROI 314 is not used again for this seed 29A. The first measurement ROI 318, the size of which is dependent upon seed species (e.g., impatiens require 10 mm), is again centered on the center of the seed 29A (80:80 pixels in this example) and must be drawn large enough to include the endpoint 316 of the root 315.

Figure 8D:
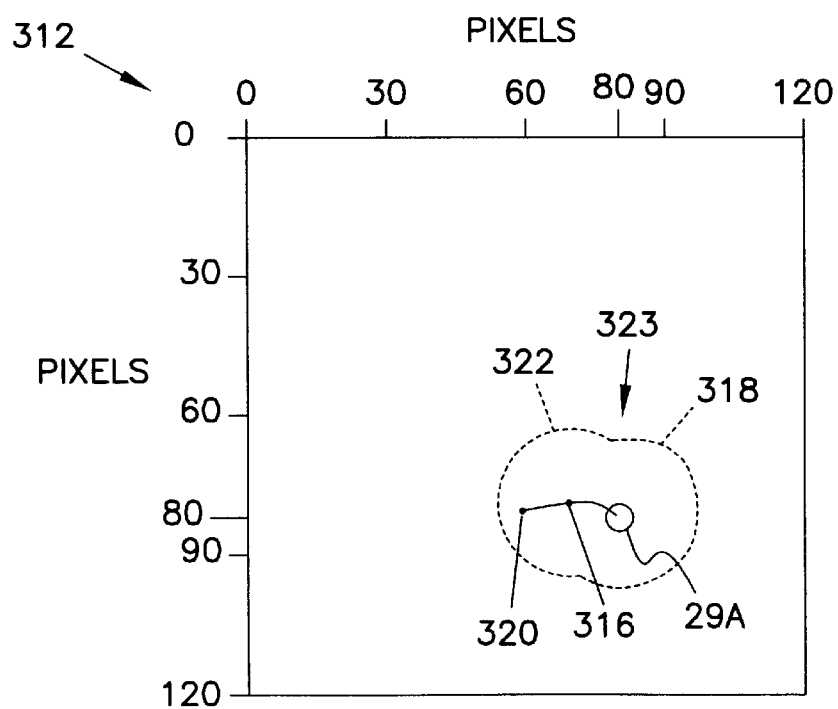

FIG. 8D corresponds with Day 4 in which a second measurement ROI 322 is drawn which is within the edge of the blotter paper and centered around the endpoint 316 of Day 3's growth, but is large enough to include the endpoint 320 of Day 4's growth. The first measurement ROI 318 and the second measurement ROI 322 together comprise the first new germination ROI 323.

Figure 8E:
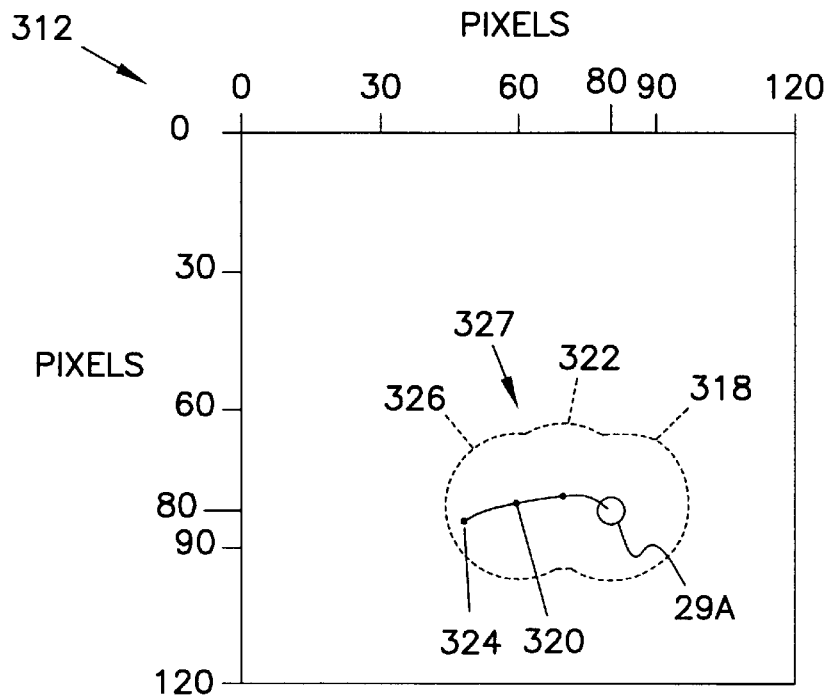

FIG. 8E corresponds with Day 5 in which a third measurement ROI 326 is drawn which is within the edge of the blotter paper and centered around the endpoint 320 of Day 4's growth, but is large enough to include the endpoint 324 of Day 5's growth. The first, second and third measurement ROI's, 318, 322, and 326, respectively, together comprise the second new germination ROI 327.

Figure 8F:
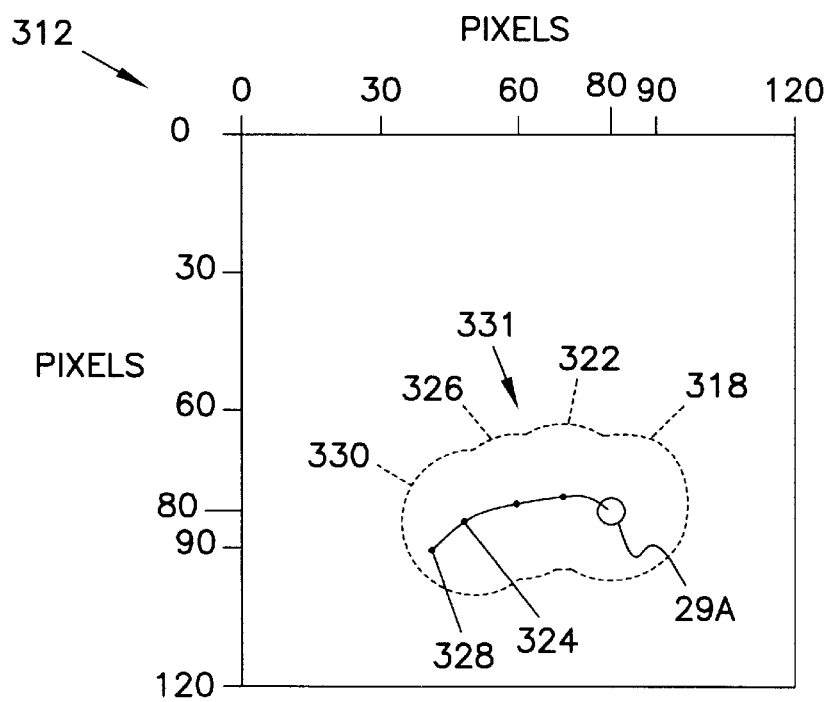

FIG. 8F corresponds with Day 6 in which a fourth measurement ROI 330 is drawn which is within the edge of the blotter paper and centered around the endpoint 324 of Day 5's growth, but is large enough to include the endpoint 328 of Day 6's growth. The first, second, third and fourth measurement ROI's, 318, 322, 326, and 330, respectively, together comprise the third new germination ROI 331.

Figure 8G:
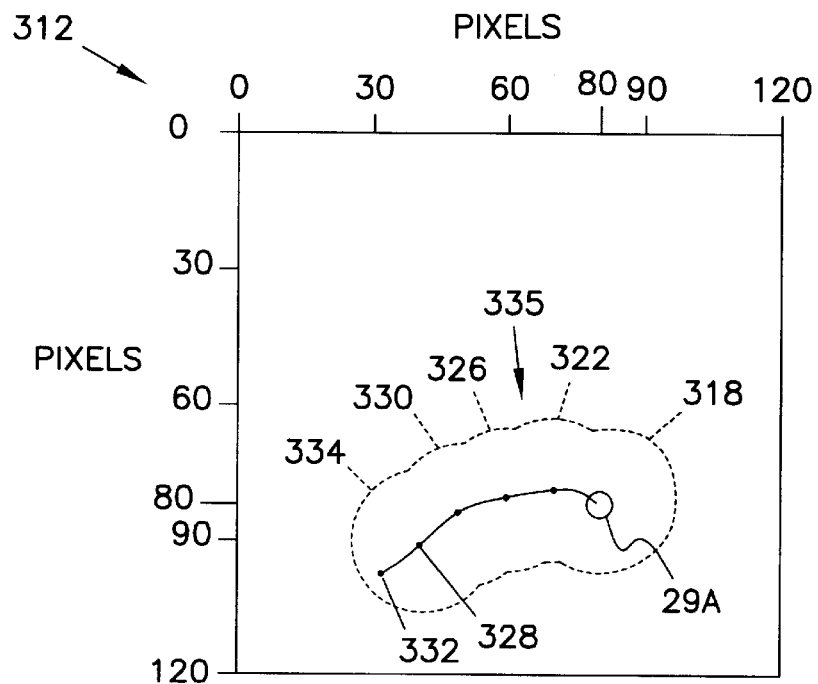

FIG. 8G corresponds with Day 7 in which a fifth measurement ROI 334 is drawn which is within the edge of the blotter paper and centered around the endpoint 328 of Day 6's growth, but is large enough to include the endpoint 332 of Day 7's growth. The first, second, third, fourth, and fifth measurement ROI's, 318, 322, 326, 330, and 334, respectively, together comprise the fourth new germination ROI 335.

Figure 8H:
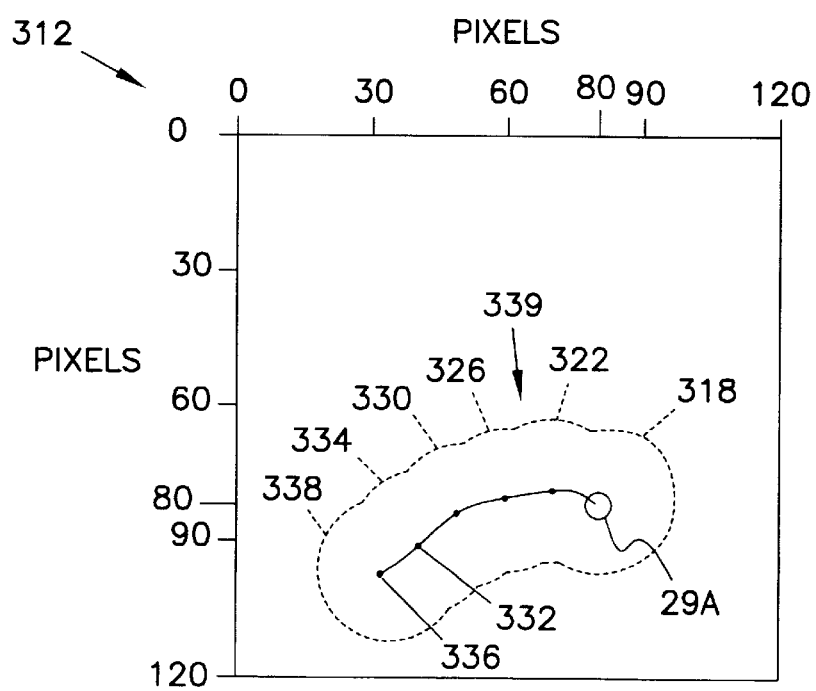

FIG. 8H corresponds with Day 8 in which a sixth measurement ROI 338 is drawn which is within the edge of the blotter paper and centered around the endpoint 332 of Day 7's growth, but is large enough to include the endpoint 336 of Day 8's growth. The first, second, third, fourth, fifth, and sixth measurement ROI's, 318, 322, 326, 330, 334, and 338, respectively, together comprise the fifth new germination ROI 339.

For each of Days 3–8 as described above, the location of the root and the root endpoint are saved to the image database 203 (See FIG. 7). Furthermore, although testing can be considered complete at any suitable point in time, testing is normally continued until about Day 8, to allow for sufficient gathering of data regarding root growth, in order to accurately predict seedlot vigor. Certain types of seeds, however, may germinate much faster, requiring a shorter test period. Other types of seeds, such as turf grass seed, can require up to 28 days to germinate, which would extend the testing period considerably.

Referring again to FIG. 7, preferably the image analysis software 204 includes a component to detect and flag data for any root measurement which is outside of an expected range. If a flag occurs, the saved image and particular seed number are flagged as flagged data in the image database 203. A root measurement can be outside of an expected range for a number of reasons, including when two or more roots have grown together, a root grows beyond the edge of the blotter paper, a root is very fine which can cause it to appear translucent so that all or part of it is not picked up on the captured image, or a fungus has enveloped the root.

The flagged data is examined manually and corrected or "fixed". This correction can include providing an accurate root measurement by manually drawing a line using a pointing device such as a mouse, corresponding to the correct root position over the top of the image in question, such as when roots have grown together or when a root is translucent and not being picked up on the captured image. The image analysis software 204 stores the position of this line, which represents the correct root position, in the image database 203.

Alternately, the flag correction can include eliminating data from the image database 203 manually by deleting the data for a given seed's root growth. Data may need to be eliminated for a number of reasons, including engulfment of a root by a fungus or growth of a root beyond the edge of the blotter paper, as discussed above. In such cases, the data up to the point just prior to the occurrence of the flag due to engulfment, or growth beyond the edge of the blotter paper, for example, remains in the image database 203.

After testing is complete, and all flags have been reset, the data analysis software 205 analyzes all of the data in the image database 203. This information is used by the reporting software 206 to generate a report regarding seedlot vigor of each seed which has been plated, with the exception of certain flagged seeds for which all or a part of the data has been removed from the image database 203 as described above.

Figure 9:
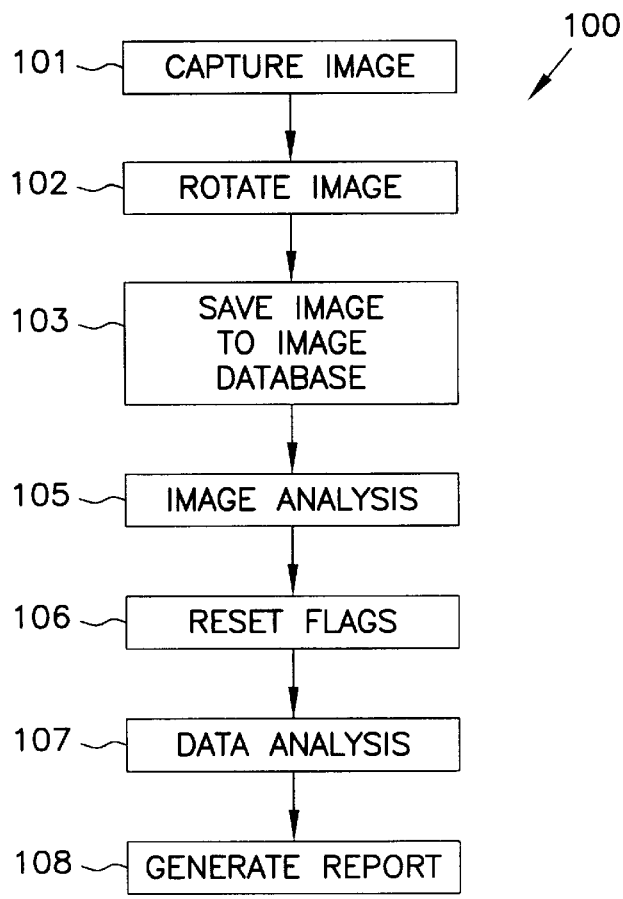
FIG. 9 is an overall flow diagram illustrating the operation of the present invention.

Referring to FIG. 9, the process of the present invention 100 begins with capturing 101 a image containing the overall ROI inside each germination box. If necessary, the captured image is then electronically rotated 102. The rotated captured image is saved 103 to an image database 203 for image analysis 105. Image analysis includes analysis of not only the initial overall ROI, but also the seed ROI, initial and successive germination ROI's, and first and subsequent measurement ROI's. Thus, a captured image can include location of a seed and location of a root which has emerged from the seed and endpoint of the root. After image analysis 105, any flags present due to root growth data outside of a predetermined range are reset 106. Finally, the data, which can include corrected data, is analyzed 107, and a report is generated 108.

Figure 10:
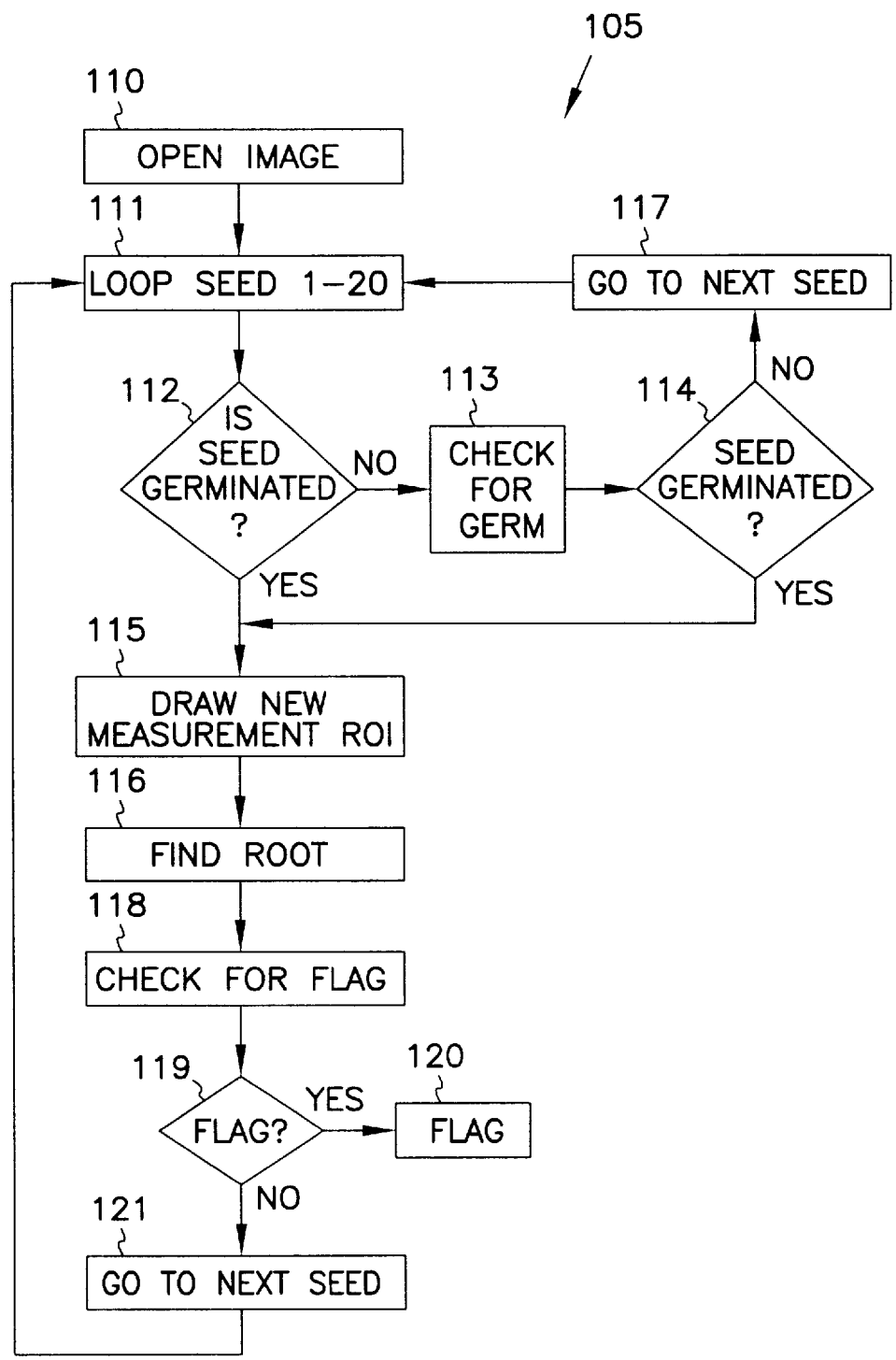
FIG. 10 is a flow diagram detailing the image analysis routine in the overall flow diagram of the present invention.

Referring now to FIG. 10, the image analysis routine 105 of the present invention begins with opening 110 the image if it is not already open. Each image is analyzed 111 in sequential order. A determination 112 is made whether or not a seed has germinated every day for each seed, until germination occurs. The default setting is that no germination has occurred, causing the check for germination routine 113 to begin.

Figure 11:
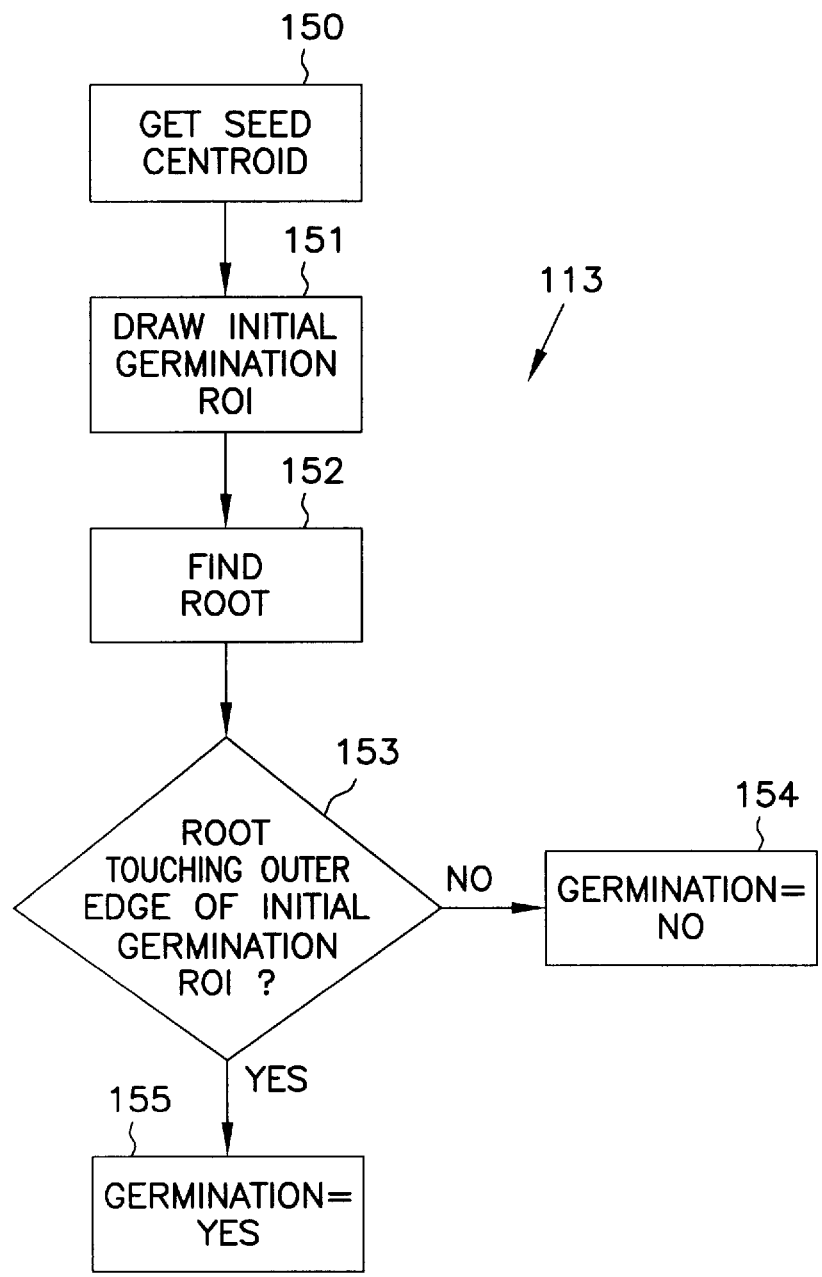
FIG. 11 is a flow diagram detailing the check for germination routine in the image analysis routine of the present invention.

FIG. 11 shows the check for germination routine 113 which begins with obtaining 150 a seed centroid as previously described in FIG. 8C, corresponding with Day 0. If the root 315 is touching the outer edge of the initial germination ROI 314, germination is determined to have occurred. If the root 315 is not yet touching the outer edge of the initial germination ROI 314, germination has not yet occurred. For a non-germinated seed, the determination 114 is made that no germination has occurred yet, so the next seed is analyzed 111.

If the root 315 is touching the outer edge of the initial germination ROI 314, germination is determined 114 to have occurred. Once germination has occurred, the seed is no longer "checked" 113 for germination, and the determination 112 is made on each successive day that germination has occurred.

On the day germination has occurred, and on each day thereafter, a new measurement ROI is drawn 115. On the day of germination (See FIG. 8C), the new measurement ROI is a first measurement ROI 318, which is centered around the seed centroid 29A as previously described. On the next day the new measurement ROI is a second measurement ROI 322, the following day the new measurement ROI is a third measurement ROI 326, and so on, until testing is complete, usually in about eight (8) days. Each new measurement ROI is centered around the endpoint of the previous day's root growth. The new germination ROI on each day is a combination of the current day's new measurement ROI and the previous day's new measurement ROI as previously discussed in reference to FIGS. 8A–8H. On each day, the location of the root and the root end point are saved to the image database 203.

Referring again to the day of germination (See FIG. 8C), after the first measurement ROI 318 is drawn, the root and root endpoint 316 is found 116 are found within the first measurement ROI 318. The presence of flags is then checked 118. Possible reasons for flags have been described herein. If it is determined 119 that there are no flags, the next seed 121 is analyzed. If there are flags 120, the image and seed number are flagged in the image database 203. This routine is followed each day for each successive measurement ROI, with the root and root endpoint being found within each successive measurement ROI, and the presence of flags checked for 118.

Figure 12:
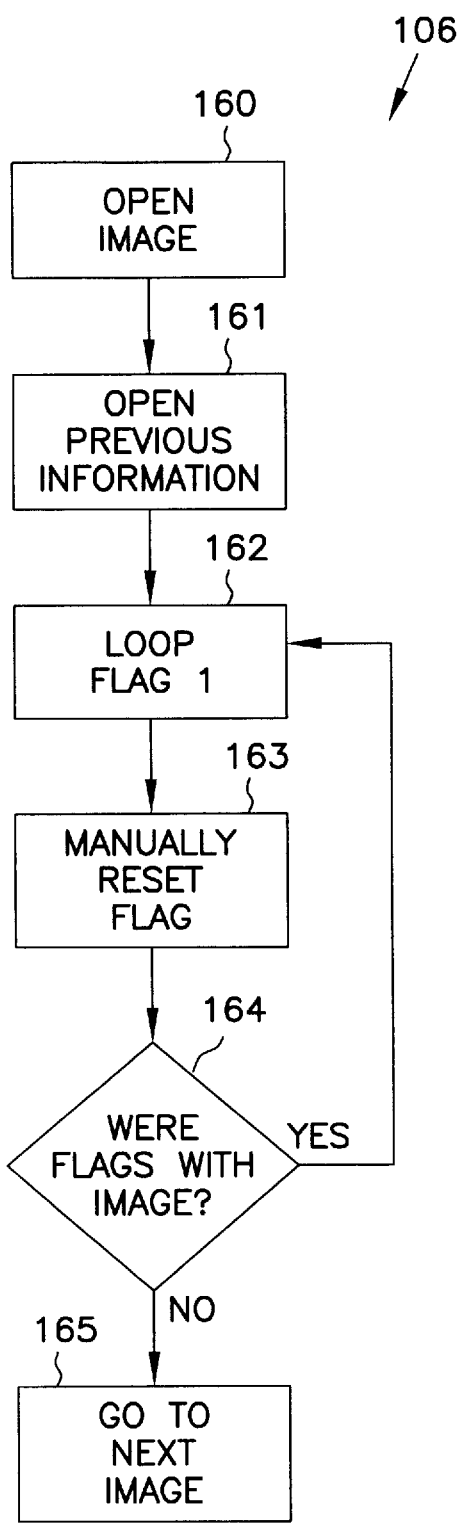
FIG. 12 is a flow diagram detailing the reset flags routine in the overall flow diagram of the present invention.

FIG. 12 shows the reset flags routine 106 which begins with opening 160 an image and all of the information 161 associated with that image. Each flag 162 is checked in sequential order. The flag is then reset manually 163 as described above. If there are more flags 164 associated with this image, the next flag 162 is then checked. If not, the next image 165 in the process is analyzed.

The invention will be further described by reference to the following detailed example. This example is offered to further illustrate the various specific and preferred embodiments and techniques. It should be understood, however, that many variations and modifications may be made while remaining within the scope of the present invention.

EXAMPLE

Seedlot Vigor Characteristics of 20 Impatiens Seedlots

Twenty seedlots of impatiens seed (*Impatiens wallerana* 'Accent Red,' produced in 1994 and obtained from Goldsmith Seeds, Inc., Gilroy, Calif.) were used in this study. The study was conducted according to the conditions set forth in the AOSA standard for a blotter paper test for impatiens seeds, with the exception of the number of seeds plated. In this study, exactly 20 impatiens seeds were plated on each blotter paper apparatus and 12 replications in total were utilized for a total of 240 seeds.

Germination Box Set-up.

Two layers of Blue Anchor germination blotter paper were placed over five layers of Kimpac seed germination paper and these seven layers were placed in a 11×11×4 cm clear plastic germination box. At the time of plating a quantity of distilled water more than sufficient to completely saturate the paper was added to each box. Each box was oriented vertically for approximately 60 seconds to allow excess liquid to drain. Finally, 20 seeds were plated in a 4×5 pattern on top of the blotter paper.

Environmental Conditions.

The germination boxes were placed inside environmentally controlled growth chambers maintained at 25°±1° C. over the course of the study. Irradiance from cool-white fluorescent lamps provided photosynthetic photon flux (PPF) inside the chambers of approximately 100 $\mu molm^{-2}s^{-1}$ for 12 hours each day.

Experimental Design.

Seedlots were arranged in a randomized complete block design. The experiment was replicated three times over space in three identical growth chambers. For each seedlot, twenty seeds were plated into each of four germination boxes in each replication. Thus, a total of 240 observations were collected for each seedlot.

Data Collection.

Time of emergence and radicle growth rate were monitored using the machine vision system of the present invention. Total root length of each seedling was measured daily after emergence. Each seed was rated for relative seed vigor from zero to ten with zero indicating failure to emerge and ten representing excellent uniformity of emergence and radicle growth.

Discussion of Results

Figure 13:
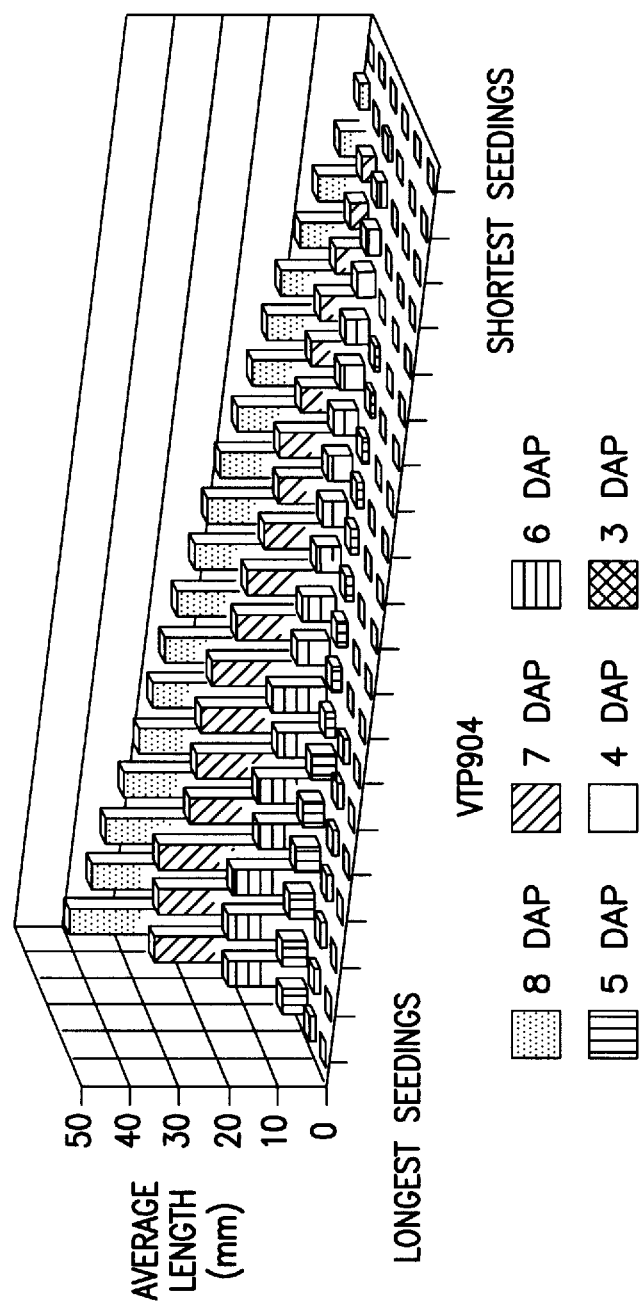
FIGS. 13–14 are graphs showing average total root length of impatiens seeds from two seedlots as described in the Example herein.
Figure 14:
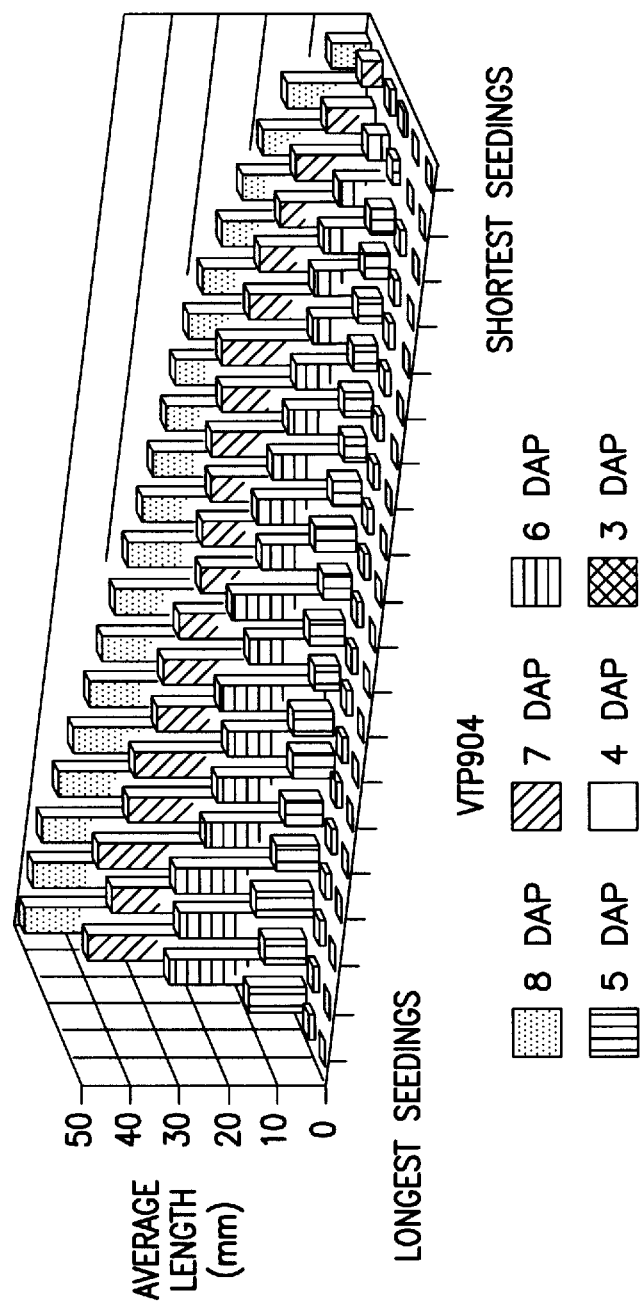

FIGS. 13 and 14 were generated using suitable graphic software. FIGS. 13 and 14 display average total root length of seeds from two seedlots, VTP904 and VTP919, respectively. These 3-D graphs depict average total root length for each of the 20 seeds, sorted from left to right in descending order, from the 12 boxes used for each seedlot. These seedlings were measured on days three (3) through eight (8) after plating (DAP). Successive rows of bars symbolize increasing number of days after plating. The front row displays root length of emerged seedlings three days after plating, while the back row exhibits data from the same seedlings five days later on day eight.

The set of bars furthest to the left represent average total root length of the longest seedling in each box wherein the right-most set represent the average of the shortest seedlings. Comparing FIG. 13 to FIG. 14, seeds from VTP919 emerged faster and more uniformly. In addition, the VTP919 seedlings tended to grow faster after emergence.

Figure 15:
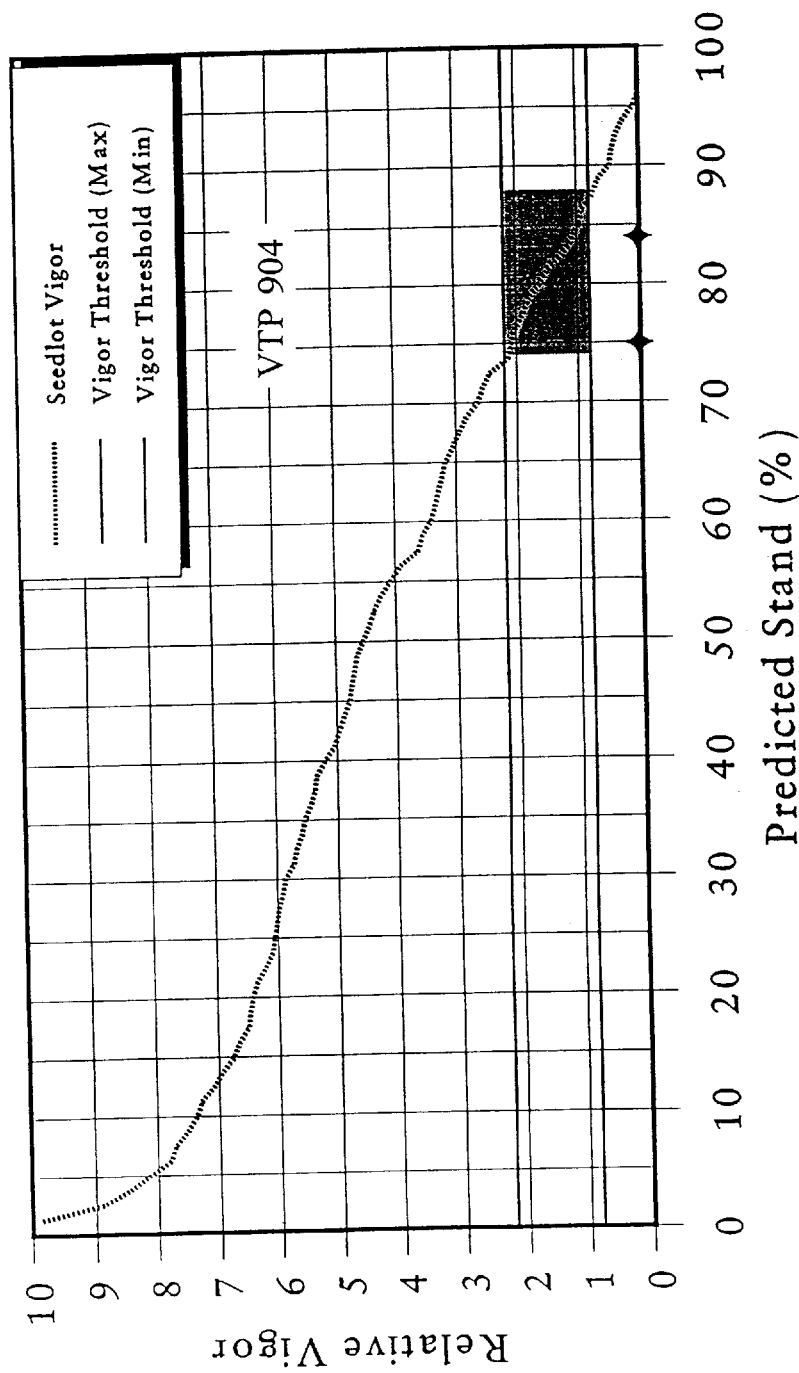
FIGS. 15–34 are graphs showing seedlot vigor rating and predicted final stand of impatiens seeds from twenty seedlots as described in the Example herein.
Figure 16:
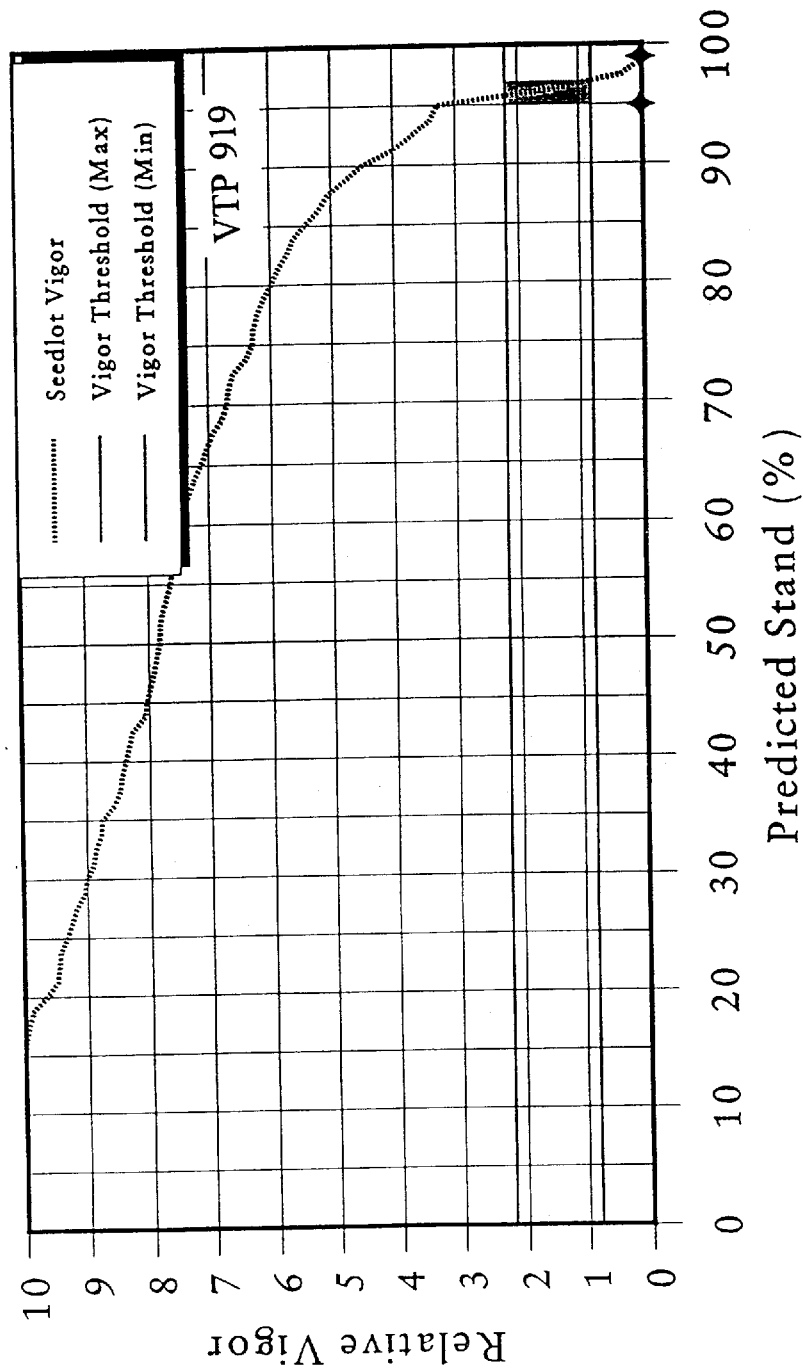
Figure 17:
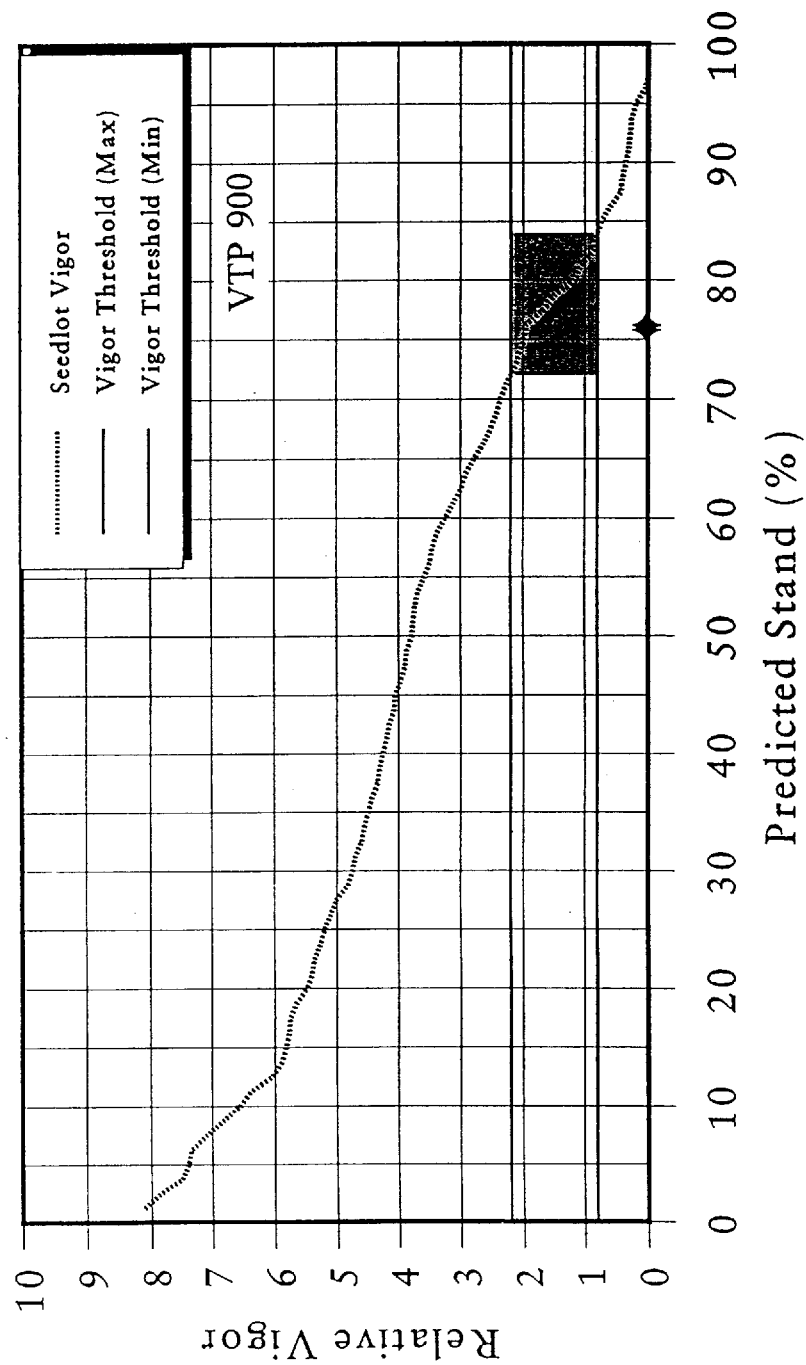
Figure 18:
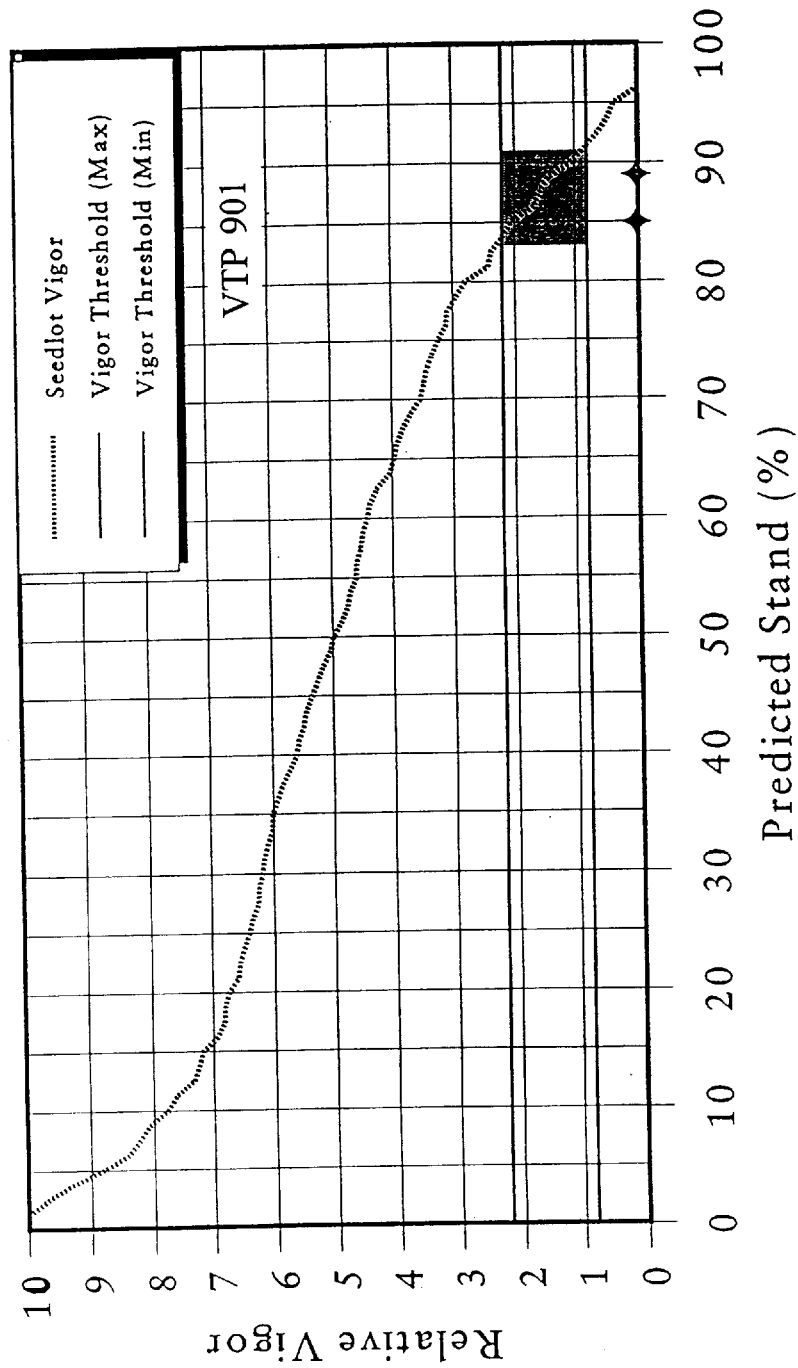
Figure 19:
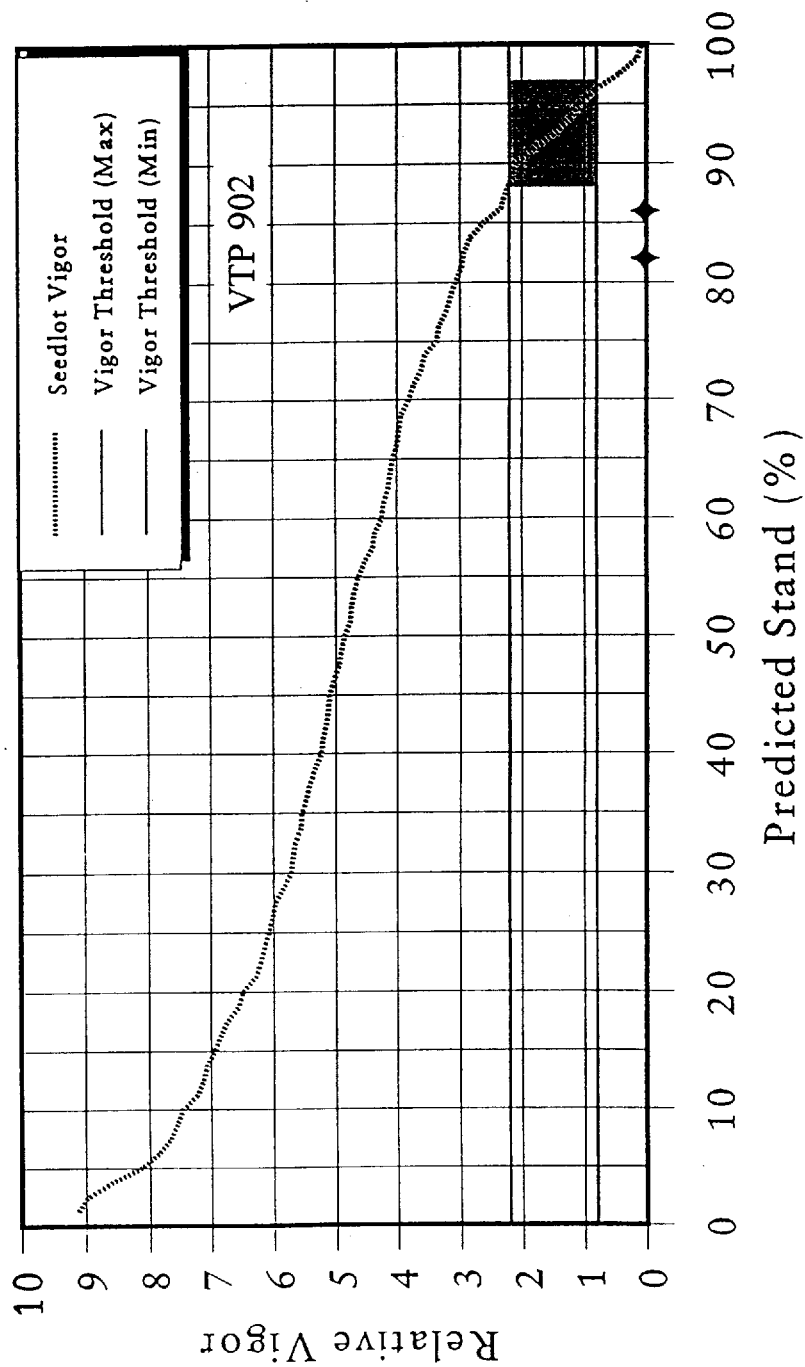
Figure 20:
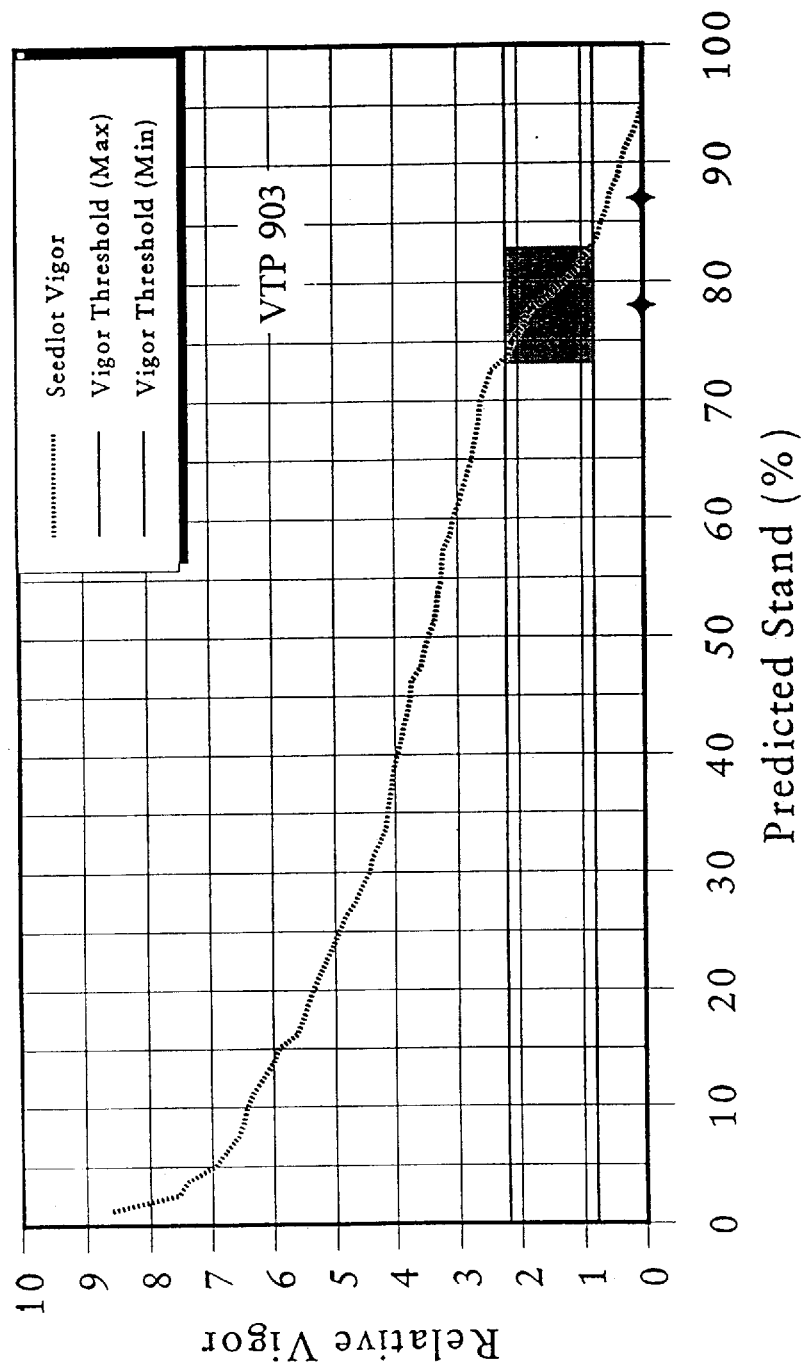
Figure 21:
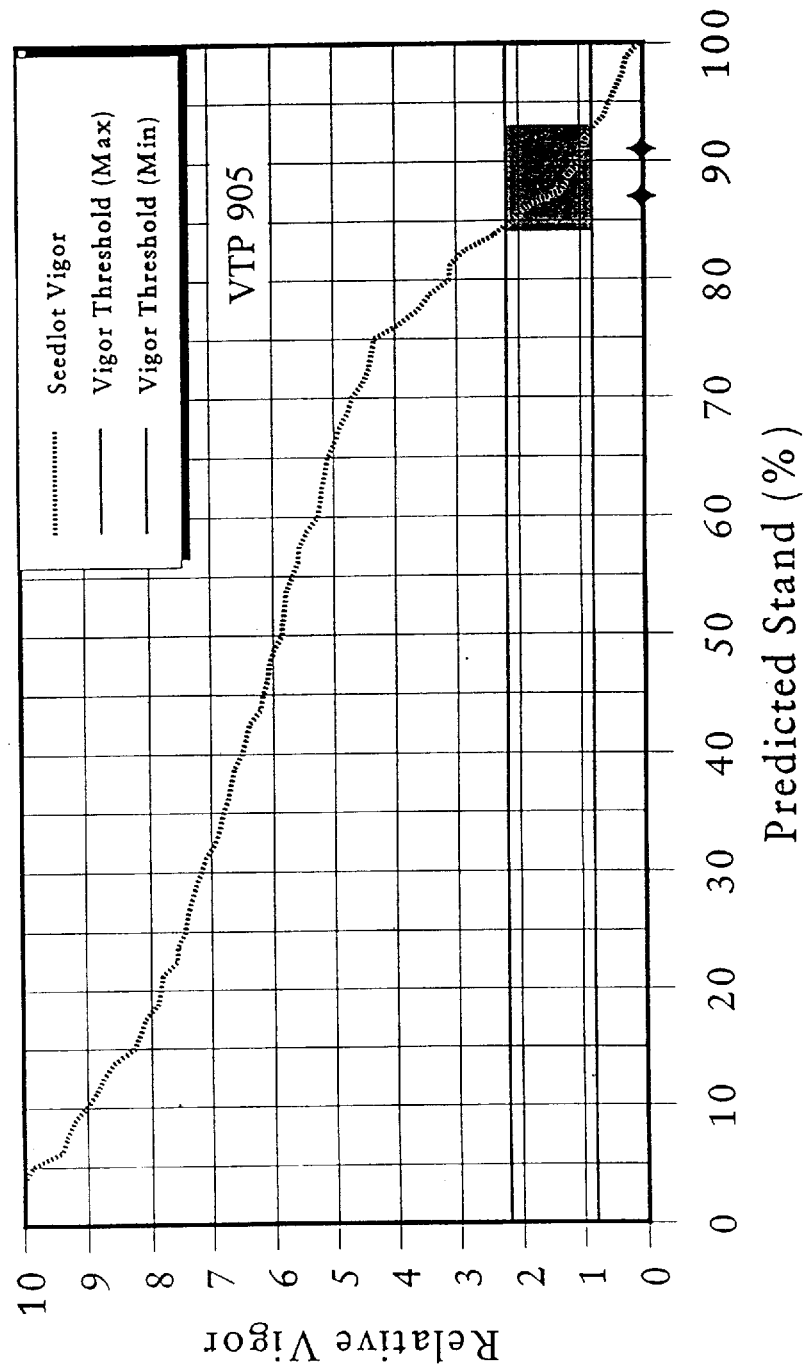
Figure 22:
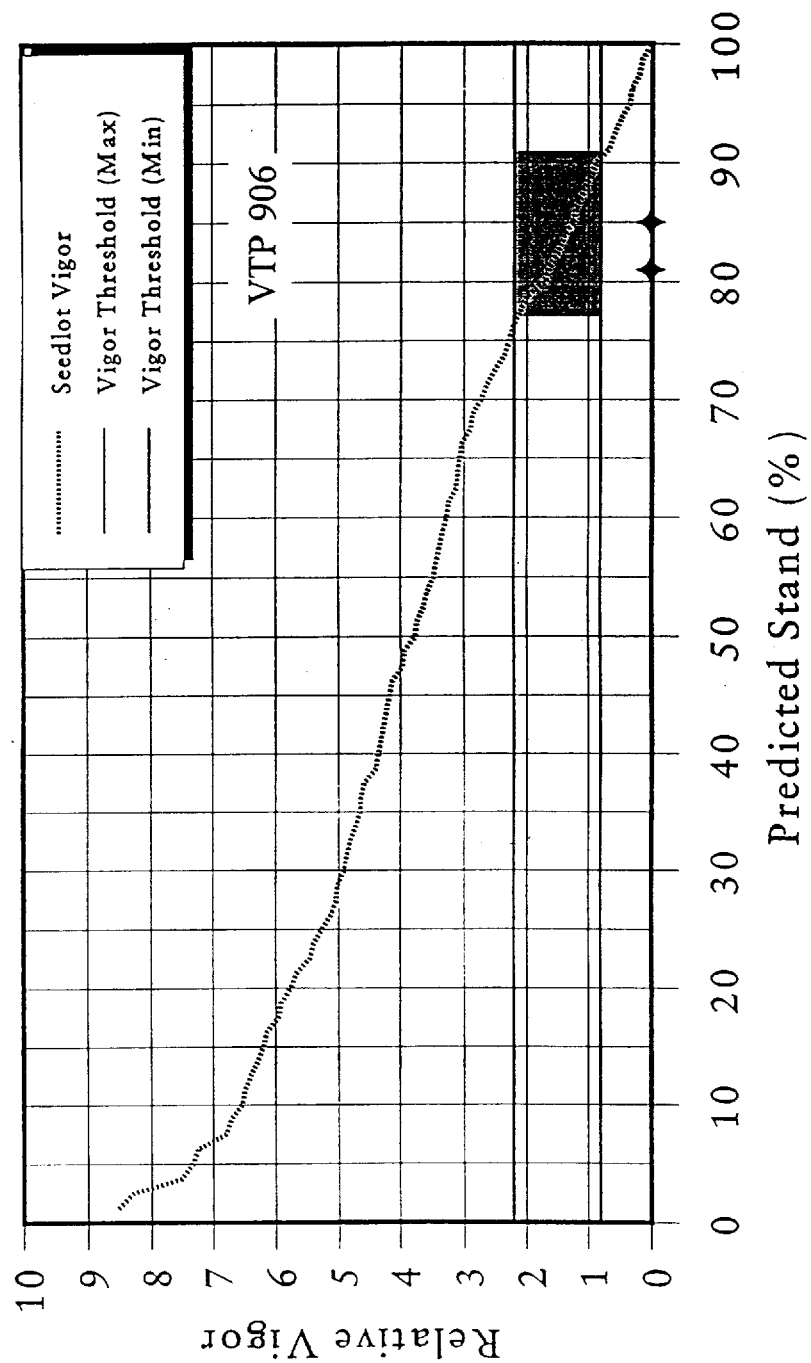
Figure 23:
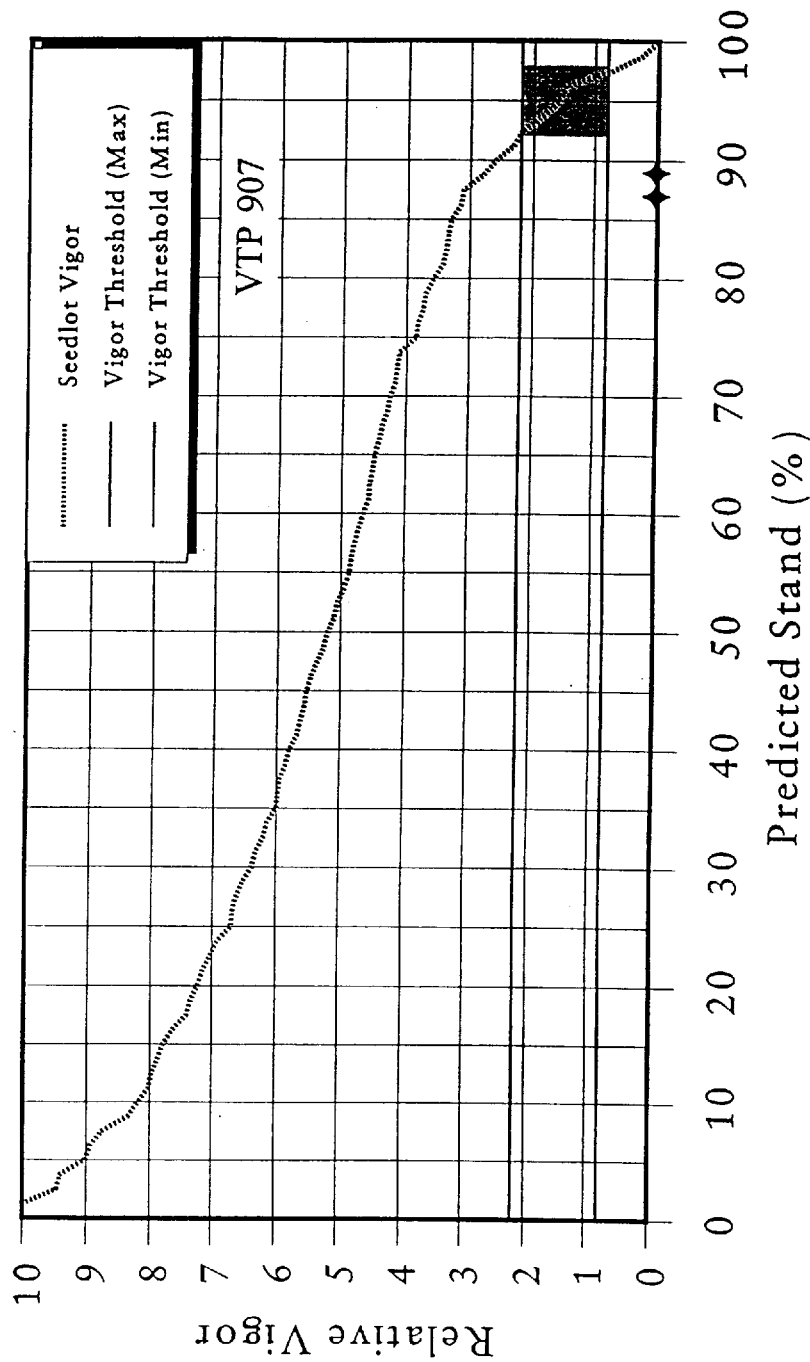
Figure 24:
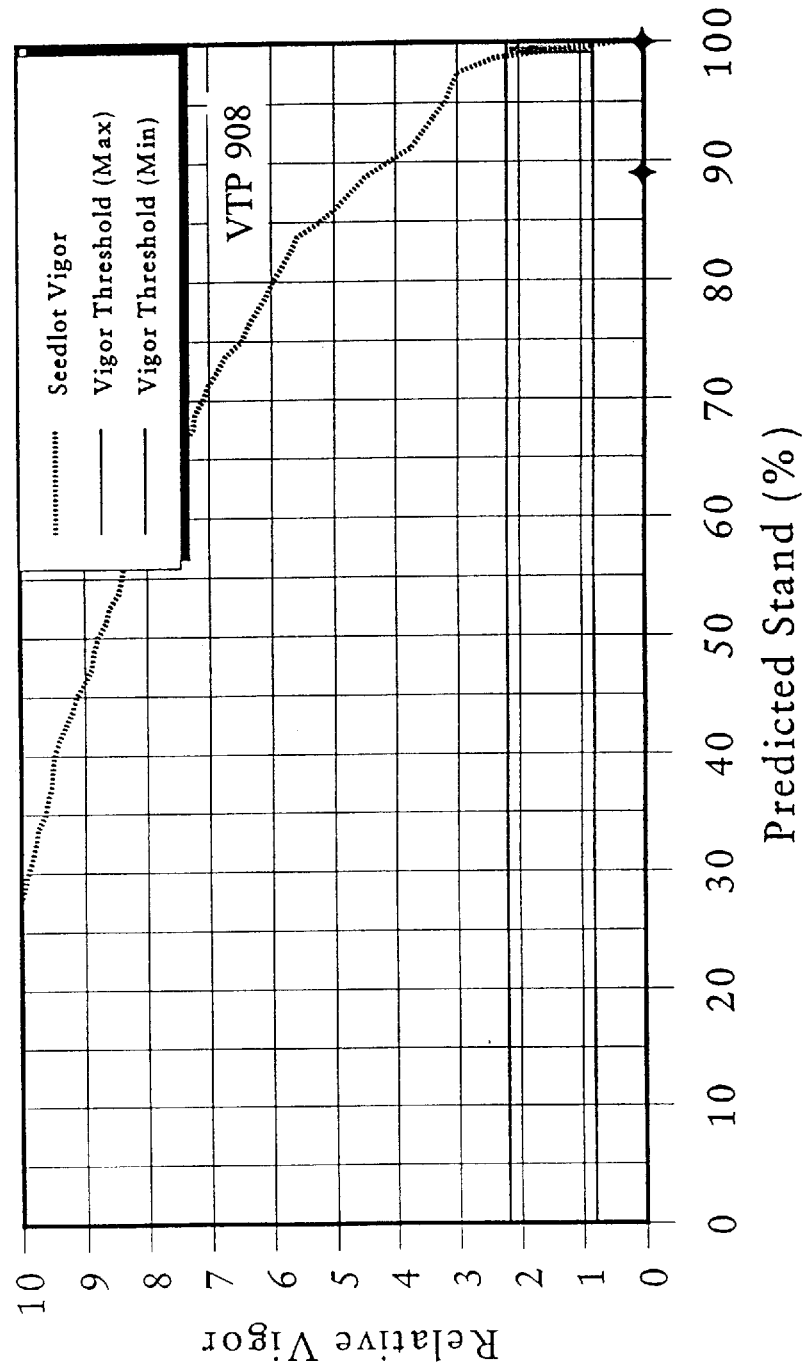
Figure 25:
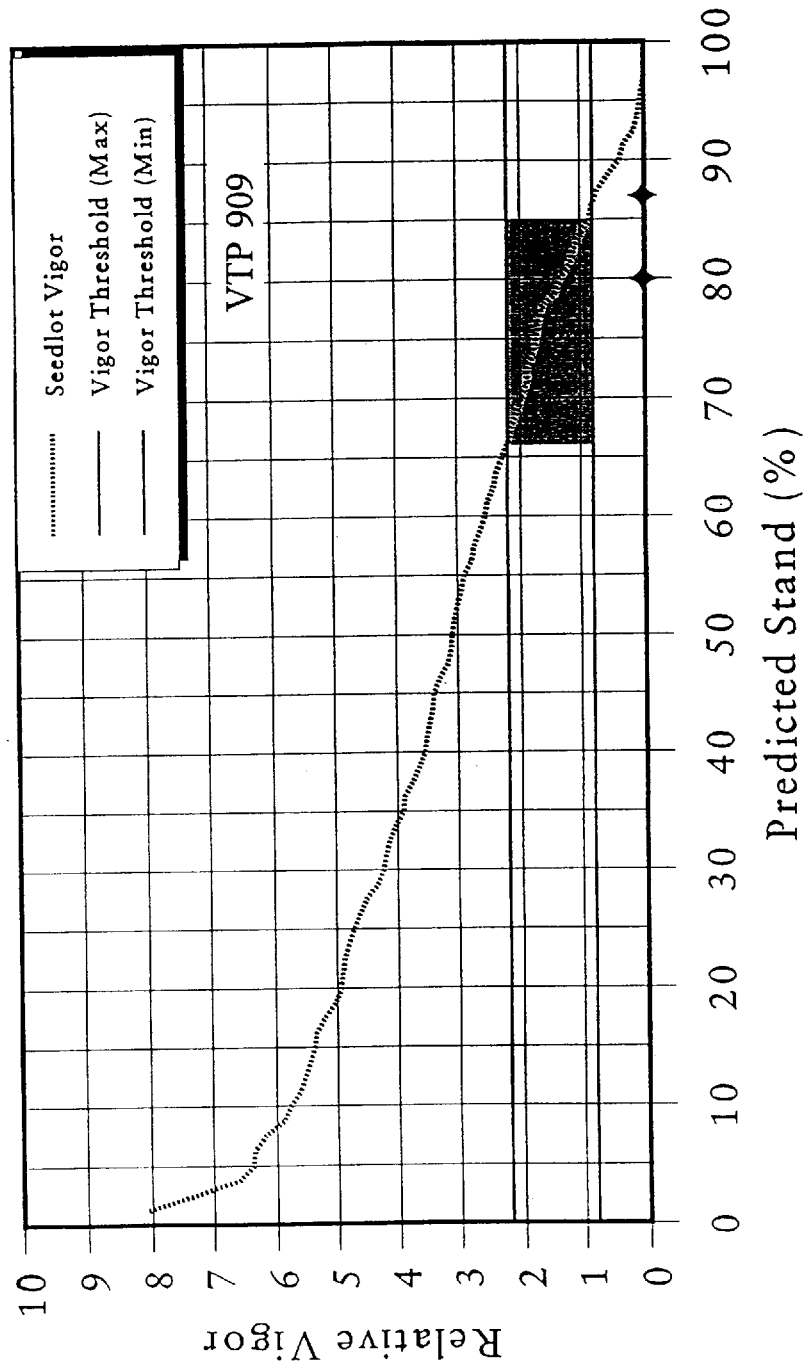
Figure 26:
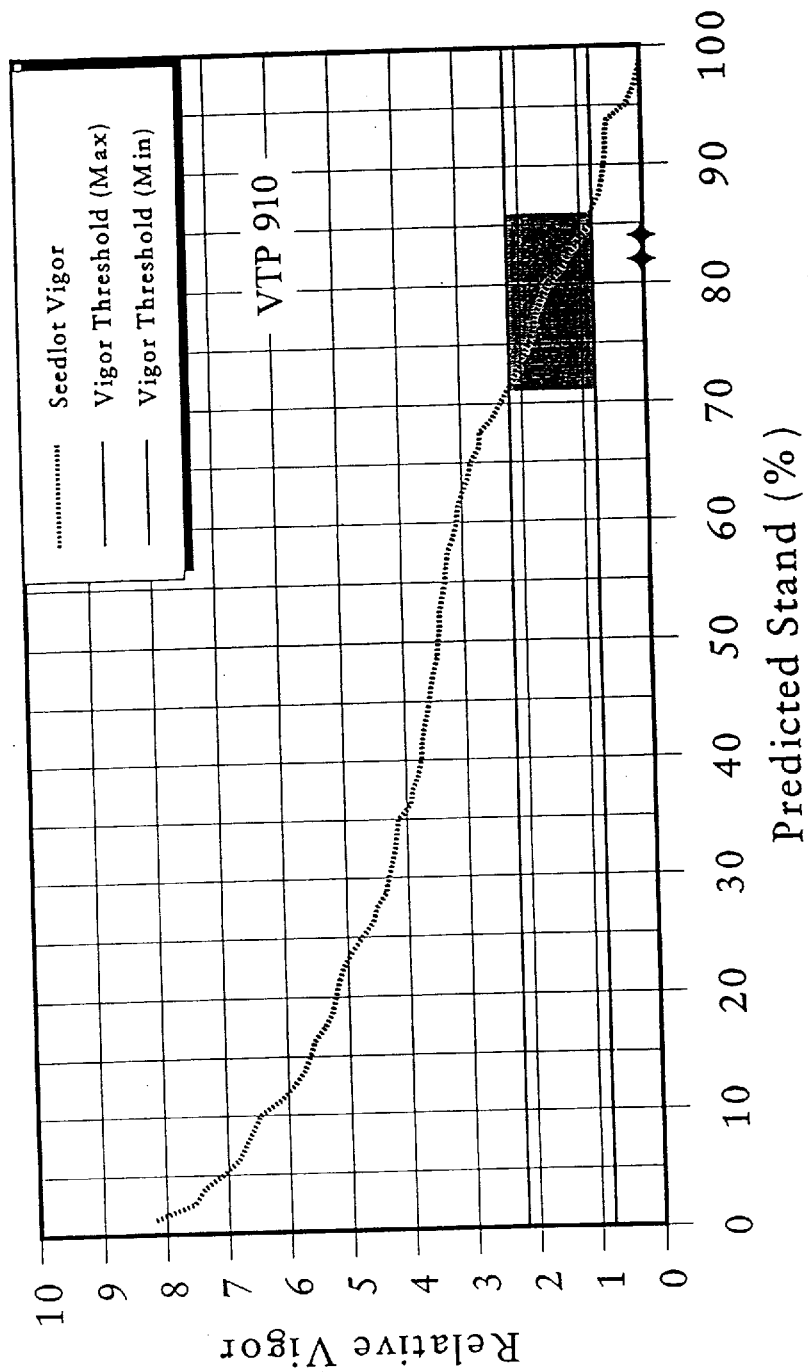
Figure 27:
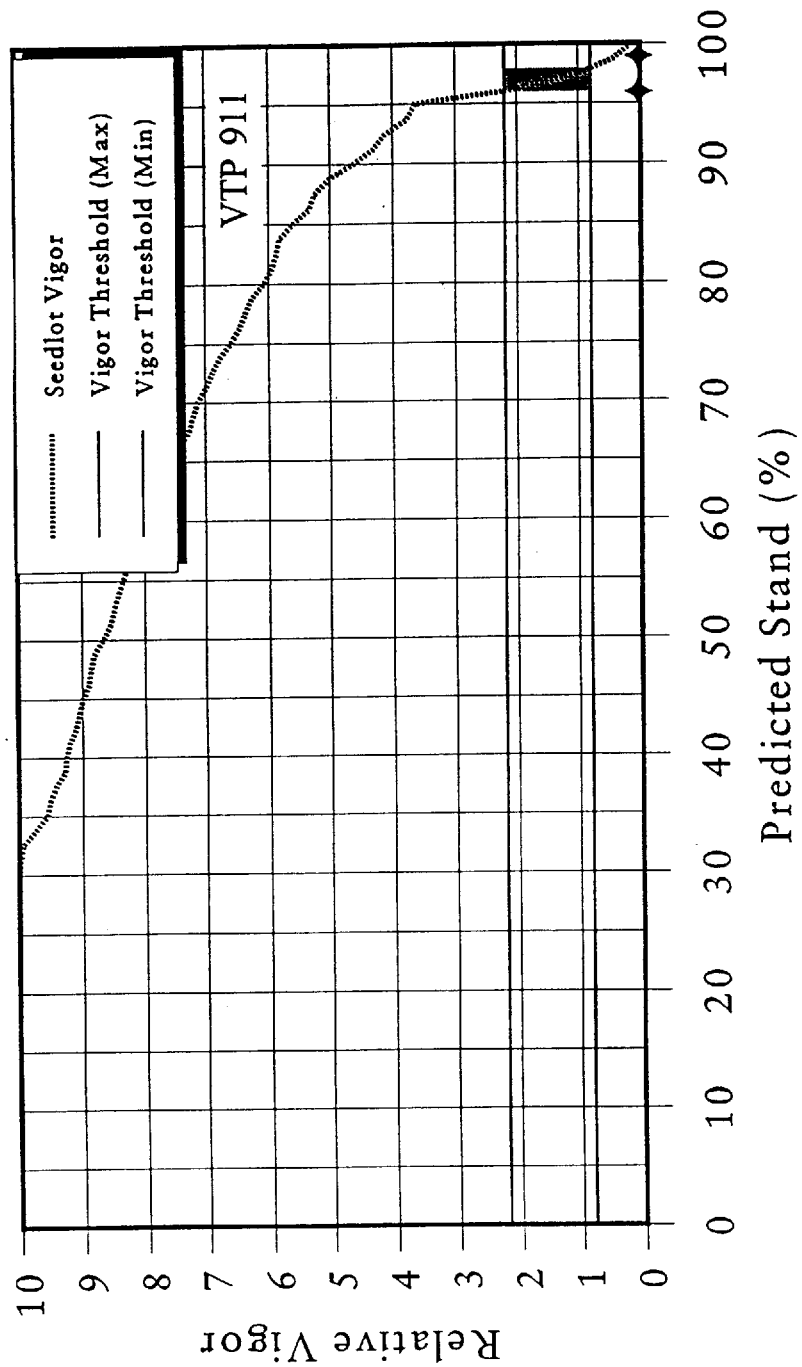
Figure 28:
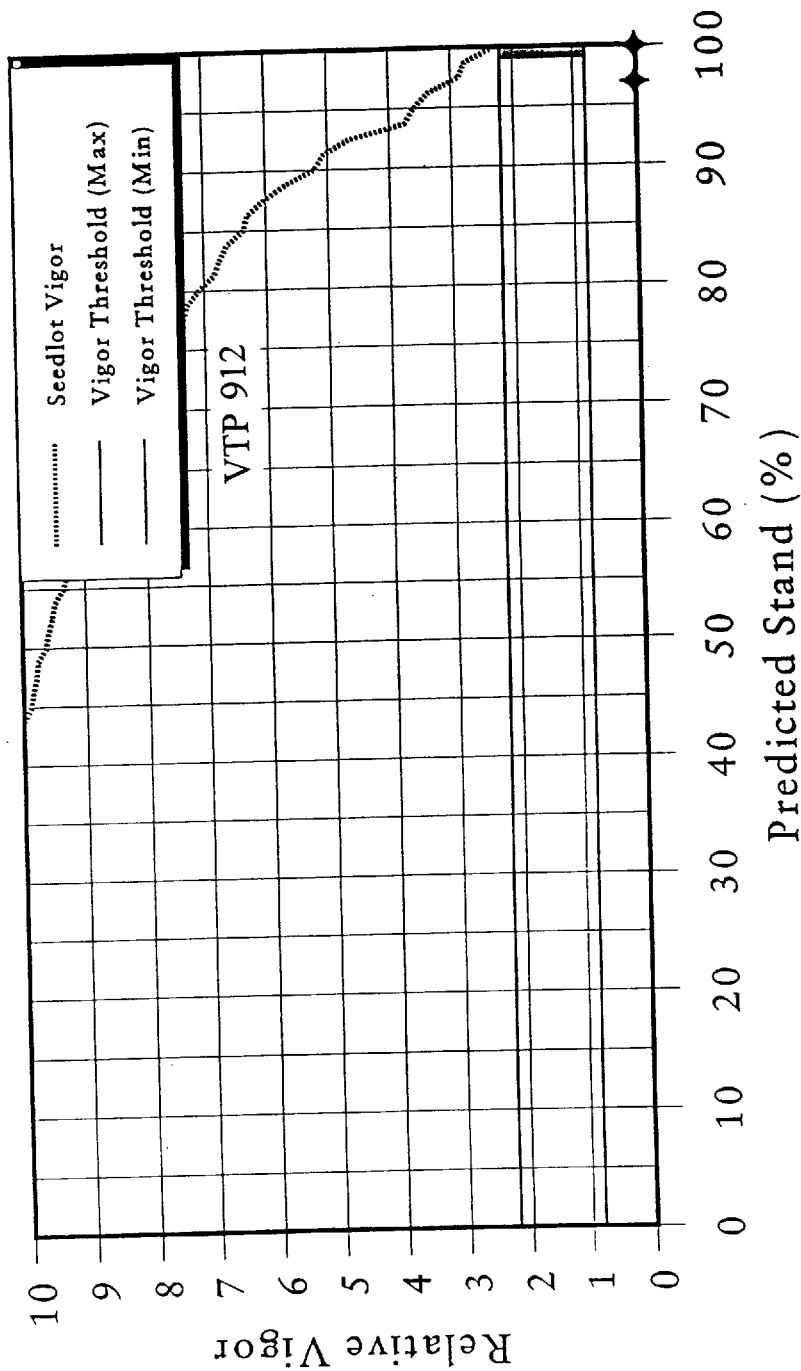
Figure 29:
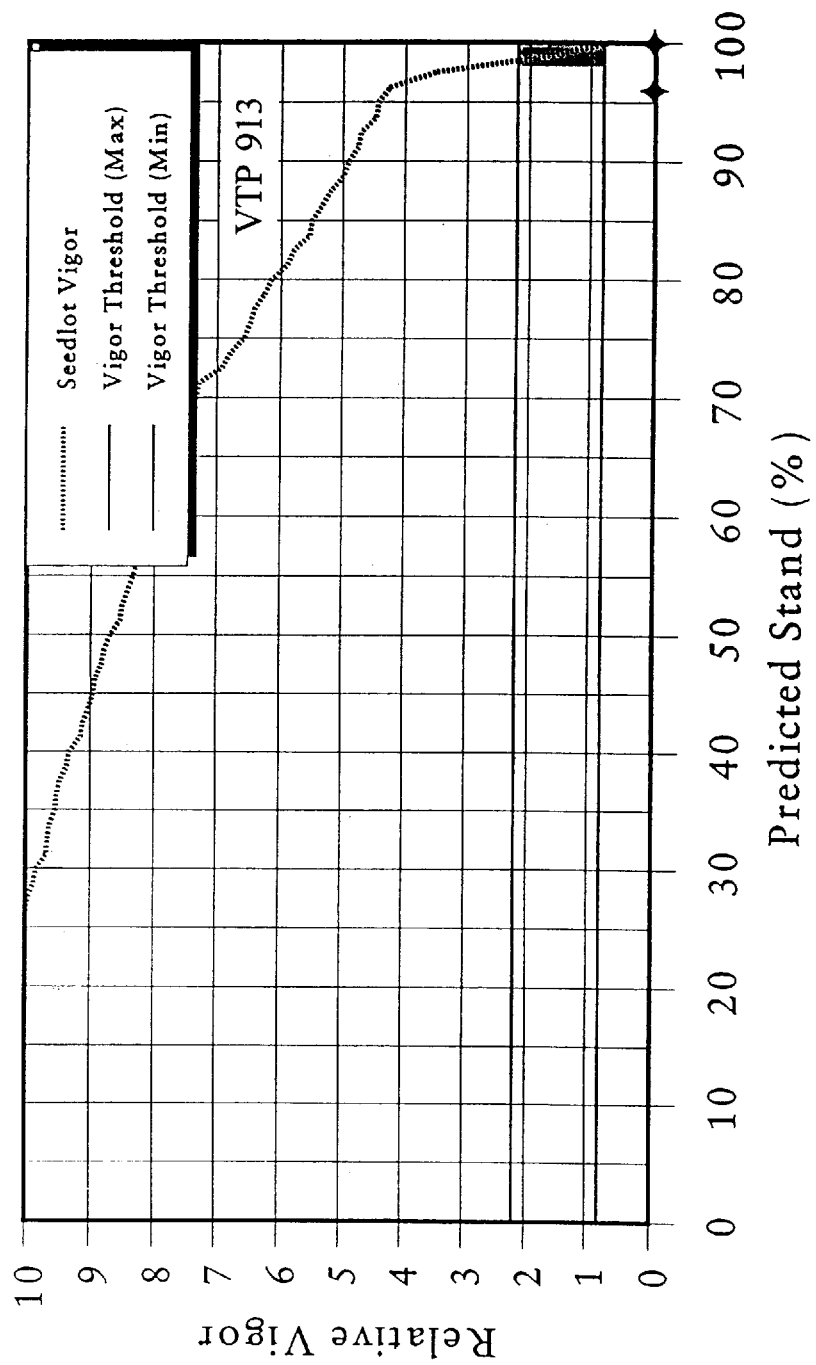
Figure 30:
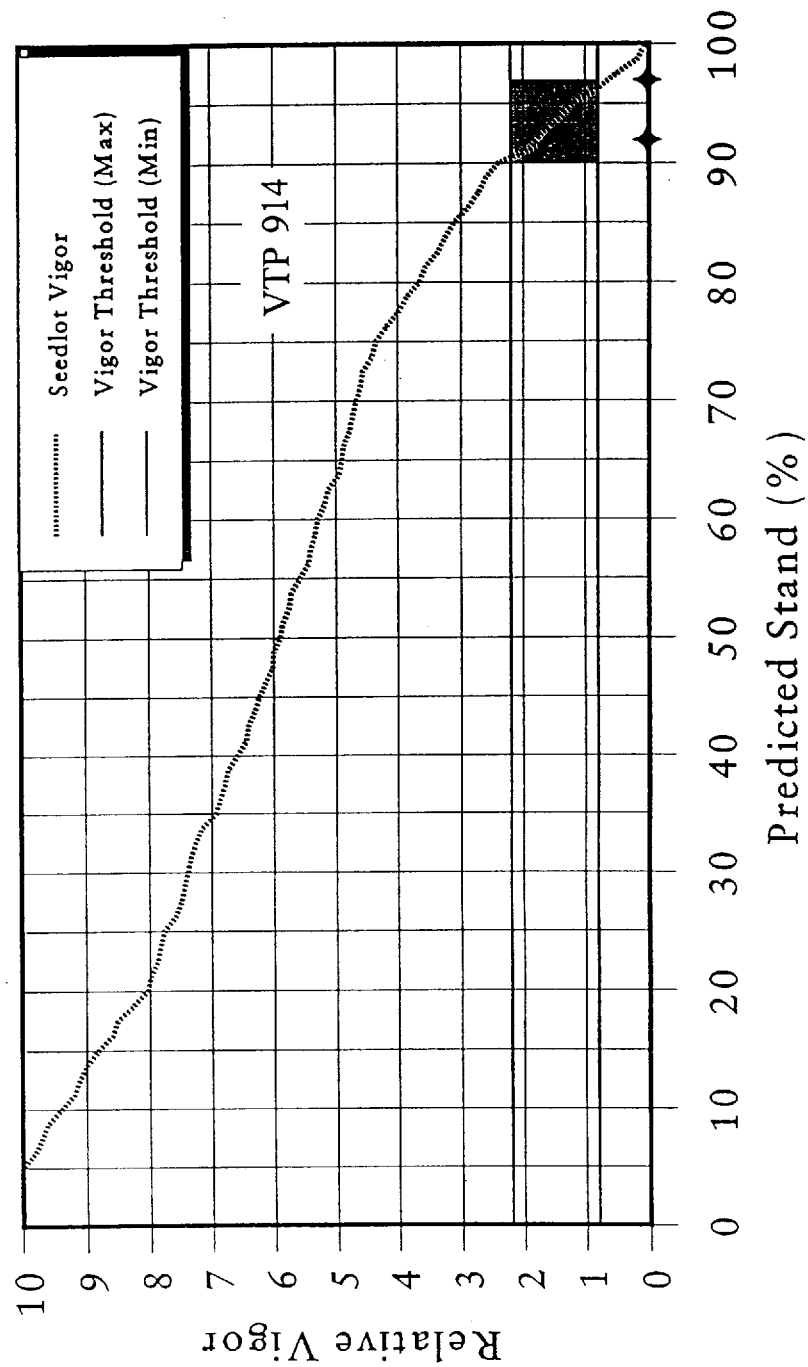
Figure 31:
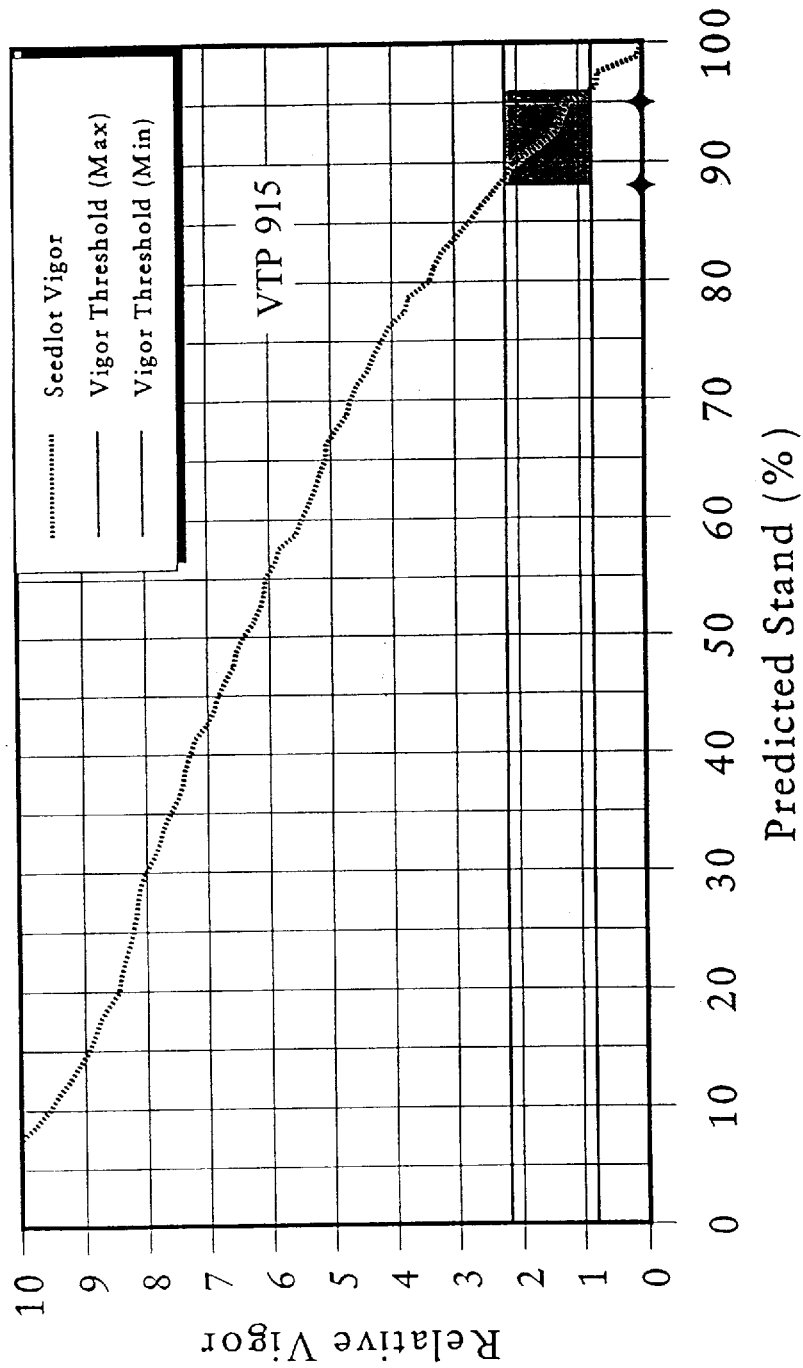
Figure 32:
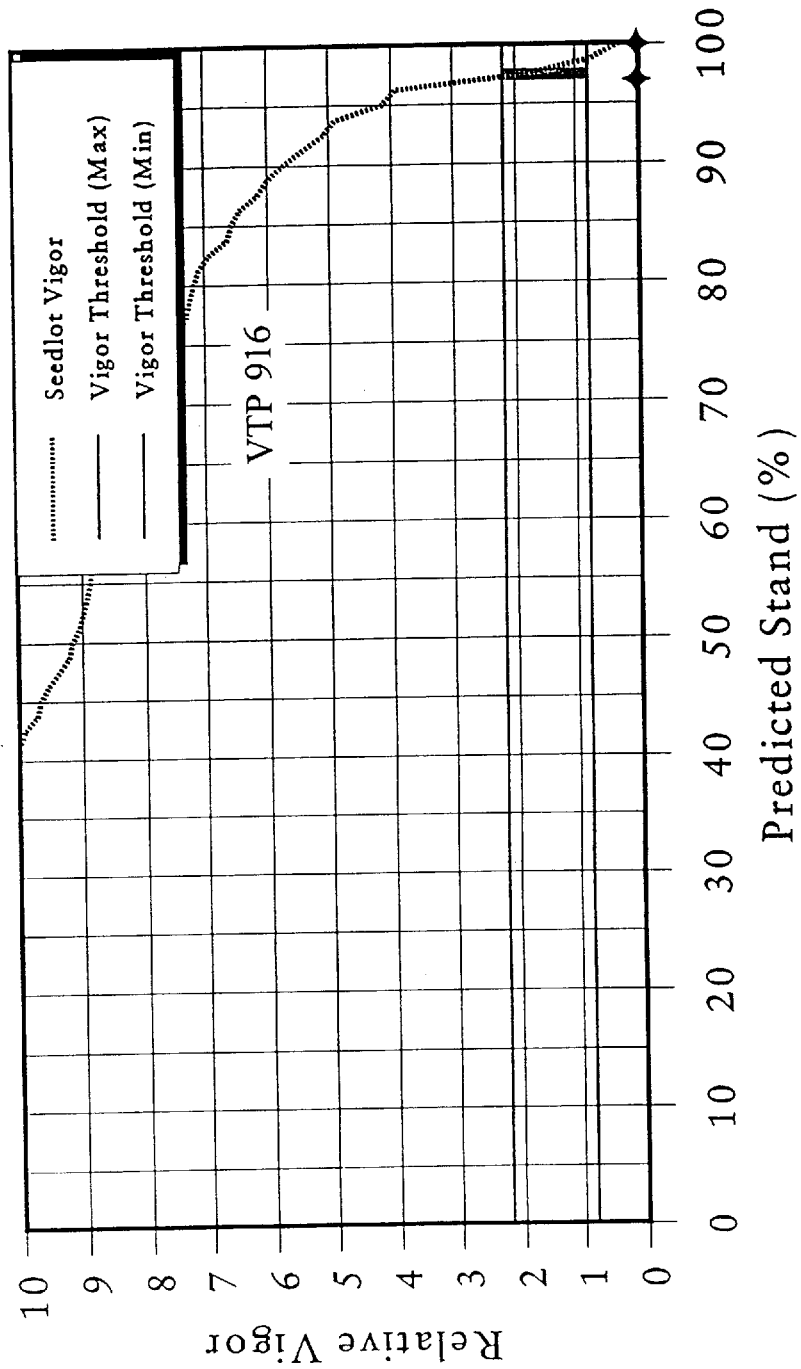
Figure 33:
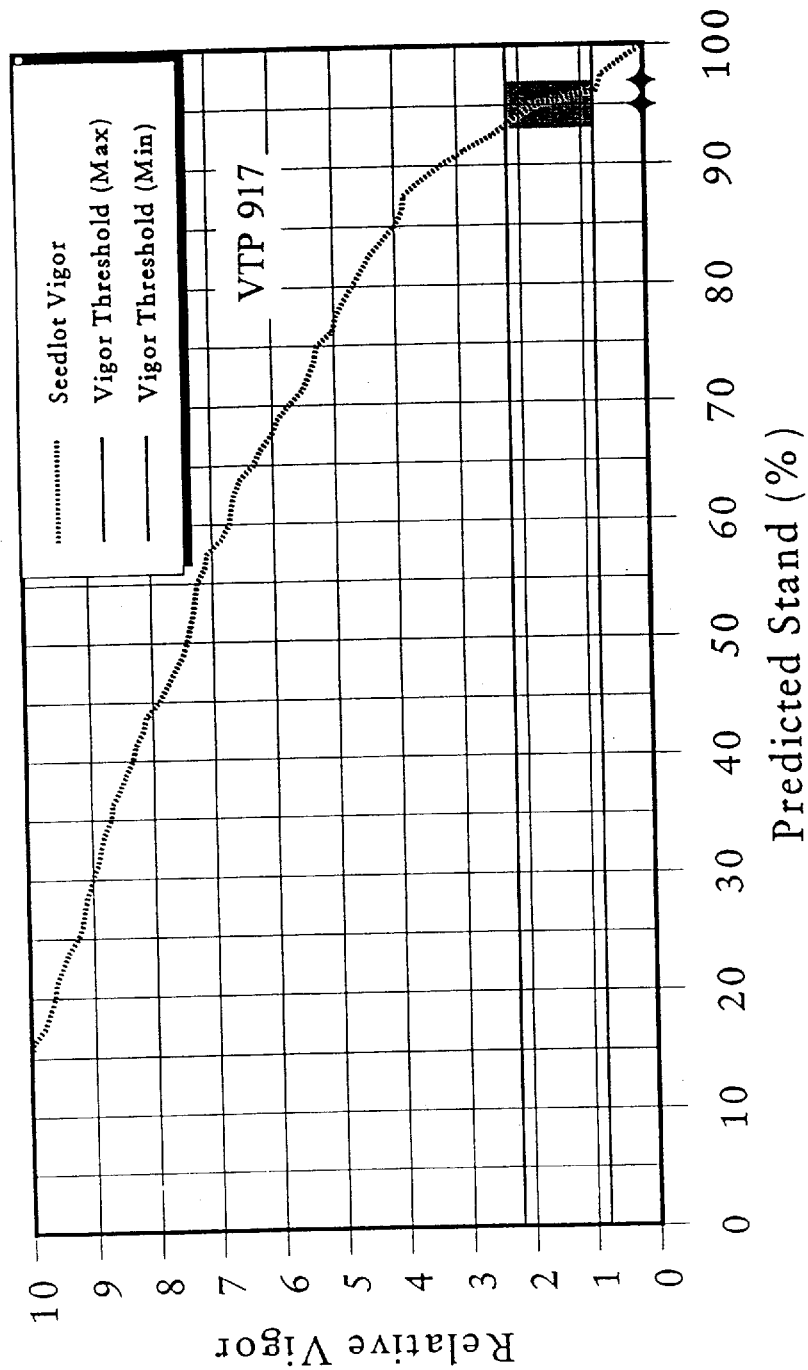
Figure 34:
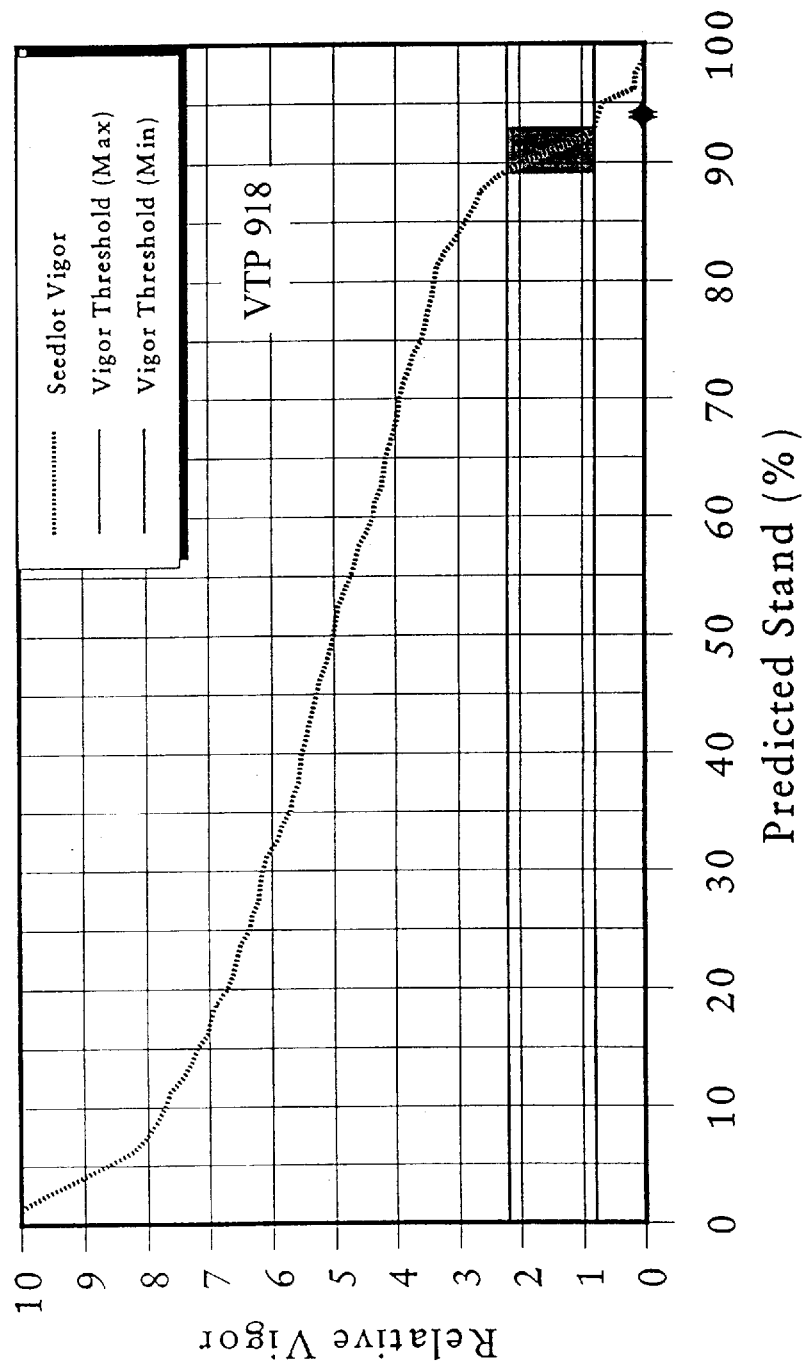

FIGS. 15 and 16, which were also generated using suitable graphic software, refer to the same seedlots, respectively, and show the same data in a different form. In this case, seeds from each seedlot have been rated for relative vigor from zero to ten with zero reflecting no emergence and ten designating excellent vigor. The relative vigor values for all of the seeds from each seedlot were then sorted from left to right in descending order. Please note the relationship between total root growth shown in each seedlots' 3-D graph and the Seedlot Vigor line in its corresponding line graph. Also, total emergence was greater than 95% in each case.

FIG. 15 illustrates why VTP904 should produce at least a 74% stand (the percentage of seeds scoring 2.2 or higher, the higher dark vertical line), but probably will not produce a final stand greater than 88% (the percentage of seeds scoring 0.8 or higher, the lower dark vertical line). By contrast, FIG. 16 suggests that VTP919 will produce a final stand of between 95% and 97%.

Concurrent with Paradigm testing, two replications using these same seedlots were grown in plug trays at Goldsmith Seeds, Inc., Gilroy, Calif. Bold tick marks on the x-axis of FIGS. 15 and 16, indicate observed final marketable plug stands. Final stand predictions generated via the Paradigm system and the range of final stands reported by Goldsmith for each seedlot are listed in Table 1.

TABLE 1

| Seedlot | Predicted Final Stand | | Observed Final Stand | | |
|---------|-----|-----|-----|-----|---|
| VTP900 | 72 | 84 | 76 | 76 | * |
| VTP901 | 83 | 91 | 85 | 89 | * |
| VTP902 | 88 | 97 | 82 | 86 | |
| VTP903 | 73 | 83 | 75 | 84 | * |
| VTP904 | 74 | 88 | 75 | 84 | * |
| VTP905 | 84 | 93 | 87 | 91 | * |
| VTP906 | 77 | 91 | 81 | 85 | * |
| VTP907 | 92 | 98 | 87 | 89 | |
| VTP908 | 99 | 100 | 89 | 100 | * |
| VTP909 | 66 | 85 | 80 | 87 | * |
| VTP910 | 71 | 86 | 82 | 84 | * |
| VTP911 | 96 | 98 | 96 | 99 | * |
| VTP912 | 99 | 100 | 97 | 100 | * |
| VTP913 | 98 | 100 | 96 | 100 | * |
| VTP914 | 90 | 97 | 92 | 97 | * |
| VTP915 | 88 | 96 | 88 | 95 | * |
| VTP916 | 97 | 98 | 97 | 100 | * |
| VTP917 | 93 | 97 | 95 | 97 | * |
| VTP918 | 89 | 93 | 94 | 94 | |
| VTP919 | 95 | 97 | 95 | 99 | * |

* Asterisk indicates range of predicted values overlaps range of observed values.

There is insufficient plug tray test data to perform a vigorous statistical analysis on the comparison between predicted and observed values. However, the seventeen (17) out of 20 overlap among ranges of predicted final stands and observed stands suggests high correlation. Table 1 presents successful predictions using seventeen (17) seedlots and another, VTP918, was close enough to likely be statistically equal. In the case of seedlots VTP902 and VTP907, increased incidence of abnormal seedlings (data not included) may explain the remaining discrepancies. Future studies using seedlots with a propensity for abnormal seedlings should allow adjustment of the algorithm to identify this type of seedlings more accurately.

FIGS. 17–34 which were also generated by suitable graphic software, show seeds from the remaining eighteen (18) seedlots which were tested. Each seedlot has been rated for relative vigor from zero to ten with zero reflecting no emergence and ten designating excellent vigor. The values for all the seeds from each seedlot were then sorted from left to right in descending order of relative vigor. The gray-shaded region between where the Seedlot Vigor line crosses the upper and lower boundaries of the Minimum Vigor Required threshold is perpendicular to the range of predicted stand values. Bold tick marks on each graphs x-axis represent the range of observed final stand of marketable plugs reported for that seedlot by Goldsmith Seeds, Inc.

Because the method and system of the present invention separates results due to seedlot vigor from effects related to the plug tray environment, one important characteristic inherent to this system is the ability to customize the test results for individual greenhouses. For the same reason one would use a standard to calibrate sensitive measuring instruments, measuring the performance of seedlots with known seedlot vigor characteristics in a specific facility can very accurately and consistently estimate the minimum vigor requirement thresholds for that specific production location.

The calibration component of the present invention relies on individual production facility participation. An imaging device, and an image analyzer are recommended to measure and analyze plug emergence and growth rate information. Such equipment can include a digital camera and lens, proper lighting, an appropriate computer with certain software components operating therein, and various equipment to connect the camera to the computer.

The method and system of the present invention has additional production management applications. Measuring plug emergence and growth rate can provide a feedback-loop mechanism. Changes in production inputs, including levels of light, water, nutrients, temperature and gases can be monitored and then compared to any corresponding changes in growth rate. Over time, a database containing such production information can become a very useful production management tool.

Finally, images collected for routine crop monitoring or of plant problems can be quickly transmitted to an appropriate extension agent or consultant for their expert opinion. One transmission option can involve an internet server which can be made available for posting of such images. Designated personnel can then be directed to retrieve the images for analysis.

Source Code Listing

Set forth below is the source code used with the Optimas computer program described herein. The Optimas program is used for the purpose of capturing an image, rotating an image, storing an image in a database, and analyzing an image. In the following programs, PREPROC1.mac contains the image rotation software 202; CENT00.mac is one portion of image analysis software 204; and MEASURE.mac contains another portion of the image analysis software 204.

```
PREPROC.mac program file
//RunMacro ( PathVariable: "initmacs/rotate.mac" );
//RunMacro ( PathVariable: "initmacs/cmplxroi.mac" );
//RunMacro ("C:/OPTIMAS5/initmacs/align.mac", );
vTopLeftROI=30:0::90:-15;
vBottomLeftROI=30:95.8::90:80.8;
vTopROI=-35.0:47.9::35.0:37.9;
vBottomROI=-35.0:-37.0::35.0:-47.0;
vFilterTHR=78.0:255.0::129.0:255.0::127.0:255.0;
vBlotterTHR=16.0:77.0::32.0:128.0::48.0:188.0;
vBackTHR=0.0:0.0::0.0:0.0::0.0:0.0;
vTargetLine=0.0:0.0::10.0:0.0;
vAlignOffset=0.0;
vLnAngle=0.0;
vOriginalBlotterArea=8105.1;  //Get from AppWare
**********
vOriginalBlotterHeight=92.183;  //Get from AppWare
**********
OriginLockWhere=0:1;
SetExport (LnAngleFromReference, 1, TRUE);
SetExport (mLnAngleFromReference, 1, TRUE);
SetExport (mLnSampledPoints, 1, TRUE);
SetExport (PtPoints, 1, TRUE);
SetExport (mPtPoints, 1, TRUE);
SetExport (LnPoints, 1, TRUE);
SetExport (mLnPoints, 1, TRUE);
SetExport (ArPoints, 1, TRUE);
SetExport (mArPoints, 1, TRUE);
SetExport (ArArea, 1, TRUE);
SetExport (mArArea, 1, TRUE);
SetExport (ArCentroid, 1, TRUE);
//************************************************
********************
Define FindBlotter( )∆//Find outline of blotter paper and
    zero rest of
```

```
frame
{
OriginLockWhere=0:1;
SelectFullScreen( );
ROIToList(,"Original");
Threshold (vBlotterTHR);
//Δ0 1 2 3 4 5 6 7 8 9 10 11 12 13
AreaCNVFactors[0 . . . 13]=0.0:1.0:-1.0:64.0:0.0:1171.0:-
    1.0:1.0:-1.0:0.0:255.0:-
1.0:-1.0:0.0;
//AreaCNVFactors[0 . . . 13]=0.0:1.0:-
    1.0:64.0:1000.0:471.0:-1.0:-1.0:-1.0:0.0:255.0:-
1.0:1.0:0.0;
Convolve                                           (,5,5,
    1:4:6:4:1:4:16:24:16:4:6:24:36:24:6:4:16:24:16:4:1:4:6:4:1);
CreateArea (,, TRUE);
MultipleMode=TRUE;
MultipleExtractAll ( );
//ArithmeticOp("Copy","Original",,,"Center",FALSE,
    FALSE);
vTotalBlotterArea=ArArea;
    Show (vTotalBlotterArea);
vBlotterOutline=mArPoints;
    Show (vBlotterOutline);
ROIToList (, "ARM_Original");
ARM_BitMap=BitMapCreate ( ,0,255,TRUE, 0);
BitMapProcess (ARM_BitMap, , 22 );
BitMapDelete (ARM_BitMap);
ArithmeticOp ("And", "ARM_Original");
SelectFullScreen( );
ROIToList(,"PostZero");
//Pause ( );
}
//*************************************************
    *******************
***********************
//*************************************************
    *******************
***********************
Define AlignBlotter( )Δ//Align blotter centroid with frame
centroid
{
OriginLockWhere=0:1;
SelectFullScreen( );
CreateArea (vBlotterOutline);
MultipleMode=TRUE;
MultipleExtractAll (TRUE);
vBlotterCentroid=ArCentroid;
CreatePoints (vBlotterCentroid);
    Show ( vBlotterCentroid);
ClearScreen( );
CreateLine ( vTargetLine );
vOffsetX=vBlotterCentroid [0];
    //Show ( vOffsetX )
vOffsetX=vBlotterCentroid [0]+10;
    //Show ( vOffsetX );
vOffsetY=vBlotterCentroid [1];
vOffCentroid=vOffsetX:vOffsetY;
    //Show ( vOffCentroid );
vSourceline=vBlotterCentroid::vOffCentroid;
    //Show (vSourceline);
CreateLine (vSourceline);
WHL_AlignROI (vSourceline,vTargetLine , FALSE);
if (vAlignoffset !=0)
    {
    Show ("vAlignoffset ",vAlignoffset);
    vsourceline=0.0:vAlignOffset:: 10.0:vAlignOffset;
        Show (vSourceline);
    CreateLine (vSourceline);
    WHL_AlignROI (vSourceline,vTargetLine , FALSE);
    }
else
    {
    }
SelectFullScreen ( );
ClearScreen ( );
//ArithmeticOp("Copy","PreAlign",,,"Center",FALSE,
    FALSE);
//Pause ( ); }
//*************************************************
*******************
***********************
//*************************************************
*******************
***********************
Define RotateBlotter( )Δ//Line up edge of blotter paper with
    bottom
of frame
{
//ArithmeticOp("Copy","PostZero",,,"Center",FALSE,
    FALSE);
OriginLockWhere=0:1;
SelectFullScreen( );
ClearScreen( );
SelectROI (vTopROI);
ROIToList(,"TopROI");
Filters ( Sobel );
Threshold (vFilterTHR);
DilateFilter (,2);
//Δ0 1 2 3 4 5 6 7 8 9 10 11 12 13
AreaCNVFactors[0         .      .      .         13]=
    0.0:1.0:1000.0:0.1:1000.0:100.0:-1.0:-1.0:-
    1.0:0.0:255.0:-
1.0:1.0:0.0;
CreateArea(,,TRUE);
MultipleMode=TRUE;
MultipleExtractAll (TRUE);
vTopAreas=(mArPoints);
vTopLineArea=(ArArea);
    Show (vTopLineArea);
LineCNVFactors[0 . . . 5]=0.0:1.0:1000.0:0.1:1000.0:5.0;
CreateLine(,,TRUE);
MultipleMode=TRUE;
MultipleExtractAll (TRUE);
vNumPoints=vectorLength (LnPoints);
vTopLine=(mLnPoints);
    vStartPtX=LnPoints [0];
vStartPtY=LnPoints [1];
vStartPtXY=LnPoints [0:1];
vEndPtX=LnPoints[vNumPoints-2];
vEndPty=LnPoints[vNumPoints-1];
vEndPtXY=vEndPtX:vEndPty;
SelectFullScreen( );
ClearScreen( );
CreateLine( vStartPtXY::vEndPtXY );
    Show (vStartPtXY::vEndPtXY);
SelectROI (vTopROI);
ArithmeticOp("Copy","TopROI" ,,,"Center",FALSE,
    FALSE);
MultipleMode=TRUE;
MultipleExtractAll (TRUE);
vLnAngle=LnAngleFromReference;
```

```
   Show(vLnAngle);
if (vLnAngle>90)
{
if (vLnAngle>270)
{
vLnAngle=360.00-vLnAngle;
else
{
vLnAngle=180.000-vLnAngle;
}
}
else
{
vLnAngle=vLnAngle;
}
   Show(vLnAngle);
OriginLockWhere=0:1;
SelectFuliScreen( );
ClearScreen( );
WHL_RotateROI ( vLnAngle, 1); //rotate image around
   reference point
Pause ( );
}
//***********************************************
     ******************
**********************
//***********************************************
     ******************
**********************
Define FindEdgeHeight( ) //Find distance from top/bottom
   edge of blotter
paper and frame
{
OriginLockWhere=0:1;
SelectROI (vTopROI);
//ROIToList (, "TopRegion");
Threshold (vBackTHR);
//∆0 1 2 3 4 5 6 7 8 9 10 11 12 13
AreaCNVFactors[0           .      .        13]=
   0.0:1.0:1000.0:0.1:1000.0:100.0:-1.0:-1.0:-
   1.0:0.0:255.0:-
1.0:1.0:0.0;
CreateArea (,, TRUE);
MultipleMode=TRUE;
MultipleExtractAll ( );
vNotBlotterArea=ArArea;
vTopHeight=vNotBlotterArea/70;
//show (vTopHeight);
SelectFullScreen( );
ClearScreen( );
//ArithmeticOp("Copy","TopRegion" ,,,"Center",FALSE,
   FALSE);
//***********************************************
     ******************
//Find distance from bottom edge of blotter paper and frame
OriginLockWhere=0:1;
SelectROI (vBottomROI);
//ROIToList (, "BottomRegion");
Threshold (vBackTHR);
//∆0 1 2 3 4 5 6 7 8 9 10 11 12 13
AreaCNVFactors[0           .      .        13]=
   0.0:1.0:1000.0:0.1:1000.0:100.0:-1.0:-1.0:-
   1.0:0.0:255.0:-
1.0:1.0:0.0;
CreateArea (,, TRUE);
MultipleMode=TRUE;
MultipleExtractAll ( );
vNotBlotterArea=ArArea;
vBottomHeight=vNotBlotterArea/70;
vBottomHeight=(vNotBlotterArea/70)-1.98122;  //If must
   correct for bottom
//show (vBottomHeight);
SelectFullScreen( );
ClearScreen( );
//ArithmeticOp("Copy","BottomRegion",,,"Center",
   FALSE,FALSE);
//Pause ( );
}
//***********************************************
     ******************
**********************
FindBlotter( );
if (vTotalBlotterArea !=vOriginalBlotterArea)
{
   FindEdgeHeight( );
   vBlotterHeight=95.8-(vTopHeight+vBottomHeight);
      Show (vBlotterHeight);
   vAlignOffset=vOriginalBlotterHeight-vBlotterHeight;
      Show (vAlignOffset);
      if (vTopHeight<0.1)
      {
         vAlignOffset=0-vAlignOffset;
      }
      else
      {
         vAlignOffset=0+vAlignOffset;
      }
      //Show (vAlignOffset);
}
else
{
}
AlignBlotter( );
RotateBlotter( );
Pause ( );
SaveImage ( );
SelectFullScreen( );
ClearScreen( );
ArithmeticOp("Copy","original",,,"Center",FALSE,
   FALSE);
CENT00.mac program
OriginLockWhere=0:1;
DMC_orgroi1=-40:40::-25:20;
DMC_orgroi2=-25:40::-10:20;
DMC_orgroi3=-10:40::10:20;
DMC_orgroi4=10:40::25:20;
DMC_orgroi5=25:40::40:20;
DMC_orgroi6=-40:20::-25:0;
DMC_orgroi7=-25:20::-10:0;
DMC_orgroi8=-10:20::10:0;
DMC_orgroi9=10:20::25:0;
DMC_orgroi10=25:20::40:0;
DMC_orgroi11=-40:0::-25:-20;
DMC_orgroi12=-25:0::-10:-20;
DMC_orgroi13=-10:0::10:-20;
DMC_orgroi14=10:0::25:-20;
DMC_orgroi15=25:0::40:-20;
DMC_orgroi16=-40:-20::-25:-40;
DMC_orgroi17=-25:-20::-10:-40;
DMC_orgroi18=-10:-20::10:-40;
DMC_orgroi19=10:-20::25:-40;
DMC_orgroi20=25:-20::40:-40;
DMC_SeedTHR=60.0:100.0::13.0:53.0::13.0 53.0;
```

```
DMC_PaperTHR=120.0:120.0::120.0:120.0::120.0:120.0;
DMC_RootTHR=108.0:206.0::134.0:228.0::137.0:241.0;
DMC_day3Rad=1.0;
DMC_GermROIRad=3.0;
nSteps=64;
pi=3.1415926;
twopi=2.0*pi;
DeltaAngle=twopi/nsteps;
REAL xy[nSteps,2];
/*
DMC_orgroi1b=ConvertPixelsToCalib (DMC_orgroi1);
DMC_orgroi2b=ConvertPixelsToCalib (DMC_orgroi2);
DMC_orgroi3b=ConvertPixelsToCalib (DMC_orgroi3);
DMC_orgroi4b=ConvertPixelsToCalib (DMC_orgroi4);
DMC_orgroi5b=ConvertPixelsToCalib (DMC_orgroi5);
DMC_orgroi6b=ConvertPixelsToCalib (DMC_orgroi6);
DMC_orgroi7b=ConvertPixelsToCalib (DMC_orgroi7);
DMC_orgroi8b=ConvertPixelsToCalib (DMC_orgroi8);
DMC_orgroi9b=ConvertPixelsToCalib (DMC_orgroi9);
DMC_orgroi10b=ConvertPixelsToCalib (DMC_orgroi10);
DMC_orgroi11b=ConvertPixelsToCalib (DMC_orgroi11);
DMC_orgroi12b=ConvertPixelsToCalib (DMC_orgroi12);
DMC_orgroi13b=ConvertPixelsToCalib (DMC_orgroi13);
DMC_orgroi14b=ConvertPixelsToCalib (DMC_orgroi14);
DMC_orgroi15b=ConvertPixelsToCalib (DMC_orgroi15);
DMC_orgroi16b=ConvertPixelsToCalib (DMC_orgroi16);
DMC_orgroi17b=ConvertPixelsToCalib (DMC_orgroi17);
DMC_orgroi18b=ConvertPixelsToCalib (DMC_orgroi18);
DMC_orgroi19b=ConvertPixelsToCalib (DMC_orgrol19);
DMC_orgroi20b=ConvertPixelsToCalib (DMC_orgroi20);
*1
MultipleMode=False;
SetExport(ArCentroid,1,True);
SetExport(mArCentroid,1,True);
SetExport(ArPoints,1,True);
SetExport(mArPoints,1,True);
SetExport(PtPoints,1,True);
SetExport(mPtPoints,1,True);
SetExport(LnLength,1,True);
    SetExport(mLnLength,1,True);
    SetExport(LnPoints,1,True);
    SetExport(mLnPoints,1,True);
/* Seed Centroid */
define Centroid( )
{
Threshold (DMC_SeedTHR);
ROIToList(,"original");
GrayToBinary( );
Threshold( 127.5:255.0::127.5:255.0::127.5:255.0);
DilateFilter(,4);
Threshold( 127.0:255.0 );
CreatePoints(,,TRUE);
ArithmeticOp("Copy", "original",,, "Center",FALSE, FALSE);
MultipleExtractAll(TRUE);
CreatePoints(PtPoints);
show(PtPoints);
//ClearScreen( );
ImageMask(8);
}
SelectROI(DMC_orgroi1);
Centroid( );
/*
SelectROI(DMC_orgroi2);
Centroid( );
SelectROI(DMC_orgroi3);
Centroid( );
SelectROI(DMC_orgroi4);
Centroid( );
SelectROI(DMC_orgroi5);
Centroid( );
SelectROI(DMC_orgroi6);
Centroid( );
SelectROI(DMC_orgroi7);
Centroid( );
SelectROI(DMC_orgroi8);
Centroid( );
SelectROI(DMC_orgroi9);
Centroid( );
SelectROI(DMC_orgroi10);
Centroid( );
SelectROI(DMC_orgroi11);
Centroid( );
SelectROI(DMC_orgroi12);
Centroid( );
SelectROI(DMC_orgroi13);
Centroid( );
SelectROI(DMC_orgroi14);
Centroid( );
SelectROI(DMC_orgroi15);
Centroid( );
SelectROI(DMC_orgroi16);
Centroid( );
SelectROI(DMC_orgroi17);
Centroid( );
SelectROI(DMC_orgroi18);
Centroid( );
SelectROI(DMC_orgroi19);
Centroid( );
SelectROI(DMC_orgroi20);
Centroid( );
*/
delete (nSteps, pi, r, twopi, DeltaAngle, xy);
MEASURE.mac program
vCentroid1=-32.3:27.7;
vCentroid2=-14.5:27.3;
vCentroid3=1.7:27.9;
vCentroid4=17.9:27.9;
vCentroid5=31.9:28.9;
vCentroid6=-32.7:8.1;
vCentroid7=-14.5:10.5;
vCentroid8=2.3:11.5;
vCentroid9=17.5:11.5;
vCentroid10=30.5:12.7;
vCentroid11=-33.3:-9.3;
vCentroid12=-16.1:-11.7;
vCentroid13=-0.5:-11.5;
vCentroid14=18.5:-9.5;
vCentroid15=31.0:-10.5;
vCentroid16=-32.5:-30.3;
vCentroid17=-15.5:-30.9;
vCentroid18=-0.3:-30.1;
vCentroid19=16.9:-29.9;
``` vCentroid20=30.7:−29.5;

|  |  | RED |  | GREEN |  | BLUE |  |
|---|---|---|---|---|---|---|---|
| vSeedTHR | = | 60.0 | 100.0 | 13.0 | 53.0 | 13.0 | 53.0; |
| vFilterTHR | = | 127.0 | 255.0 | 127.0 | 255.0 | 127.0 | 255.0; |
| vRootTHR | = | 65.0 | 130.0 | 98.0 | 129.0 | 97.0 | 144.0; |
| vBlotterTHR | = | 16.0 | 96.0 | 32.0 | 144.0 | 48.0 | 192.0; |
| vBackTHR | = | 0.0 | 0.0 | 0.0 | 0.0 | 0.0 | 0.0; |

```
vTopROI=−35.0:47.9::35.0:37.9;
vBottomROI=−35.0:−32.0::35.0:−47.0;
vTargetLine=0.0:0.0::10.0:0.0;
vDay3ROIRad=10.0;
vAnchorROIRad=1.5;
OriginLockWhere=0:1;
nSteps=64;
pi=3.1415926;
twopi=2.0*pi;
DeltaAngle=twopi/nsteps;
REAL xy[nSteps,2];
MultipleMode=False;
SetExport(ArCentroid,1,True);
SetExport(mArCentroid,1,True);
SetExport(ArPoints,1,True);
SetExport(mArPoints,1,True);
SetExport(PtPoints,1,True);
SetExport(mPtPoints,1,True);
SetExport(LnLength,1,True);
SetExport(mLnLength,1,True);
SetExport(LnPoints,1,True);
SetExport(mLnPoints,1,True);
SetExport(mArArea,1,True);
SetExport(ArReference,1,TRUE);
ClearScreen( );
SelectFullScreen( );
ClearScreen( );
ROIToList(,"Original");
//***********************************************
//**********************************
//**********
define SeedAnchor( )Δ//Create Classify Anchor for each seed
{
SelectFullScreen( );
ClearScreen( );
//ROIToList(,"Original");
CreatePoints (vCentroid);
MultipleMode=TRUE;
MultipleExtractAll (TRUE);
REAL xy[nSteps,2];
xy[,0]=cos((REAL)(0. . . nSteps)*DeltaAngle)* vAnchorROIRad;
xy[,1]=sin((REAL)(0. . . nSteps)* DeltaAngle)* vAnchorROIRad;
xy+=vCentroid; /* add an offset to shift the center */
CreateArea(xy);
DataCollectionType=2;
MultipleMode=TRUE;
MultipleExtract ( );
vSeedAnchor=mArPoints;
    //Show (vSeedAnchor);
ImageMask(8);
SelectFullScreen( );
ClearScreen( );
//ArithmeticOp("Copy","Original",,,"Center",FALSE, FALSE);
//Pause ( );
}
//***********************************************
//**********************************
//**********
//***********************************************
//**********************************
//**********
define CreateSeedROI( )Δ//Create ROI for each seed
{
SelectFullScreen( );
ClearScreen( );
//ROIToList(,"Original");
CreatePoints (vCentroid);
MultipleMode=TRUE;
MultipleExtractAll (TRUE);
REAL xy[nSteps,2];
xy[,0]=cos((REAL)(0. . . nSteps)* DeltaAngle)*vDay3ROIRad;
xy[,1]=sin((REAL)(0. . . nSteps)*DeltaAngle)*vDay3ROIRad;
xy+=vCentroid; /* add an offset to shift the center */
CreateArea(xy);
DataCollectionType=2;
MultipleMode=TRUE;
MultipleExtract ( );
vSeedROIOutline=mArPoints;
    //Show (vSeedROIOutline);
ROIToList(,"SeedROI");
//ImageMask(8);
SelectFullScreen( );
ClearScreen( );
//ArithmeticOp("Copy","Original",,,"Center",FALSE, FALSE);
//Pause ( );
}
//***********************************************
//**********************************
//**********
//***********************************************
//**********************************
//**********
define SharpenHighArea( )Δ//Find root area using Sharpen-High filter
{
SelectFullScreen( );
ClearScreen( );
//ArithmeticOp("Copy","SeedROI",,,"Center",FALSE, FALSE);
CreateArea(vSeedROIOutline);
CMPLX_mAreasToMasks( );
Filters ( SharpenHigh );
Threshold (vFilterTHR);
//Δ0 1 2 3 4 5 6 7 8 9 10 11 12 13
AreaCNVFactors[0.13]=0.0:1.0:−1.0:64.0:1000.0:4.0:−1.0:−1.0:−1.0:0.0:255.0:−1.0:1.0:0.0;
CreateArea (,,TRUE);
DataCollectionType=2;
MultipleMode=TRUE;
MultipleExtract ( );
ROIToList (, "ARM_Original");
ARM_BitMap=BitMapCreate ( ,0,255,TRUE, 0);
BitMapProcess (ARM_BitMap,, 22 );
BitMapDelete (ARM_BitMap);
ArithmeticOp ("And", "ARM_Original");
DilateFilter(,1);
Threshold (vFilterTHR);
```

```
// 0 1 2 3 4 5 6 7 8 9 10 11 12 13
AreaCNVFactors[0 . . . 13]=0.0:1.0:-1.0:64.0:1000.0:4.0:-
    1.0:-1.0:-1.0:0.0:255.0:-1.0:1.0:0.0;
CreateArea (,,TRUE);
DataCollectionType=2;
MultipleMode=TRUE;
MultipleExtract ( );
ROIToList(,"Sharpen");
vSharpenArPoints=(mArPoints);
vSharpenRtArea=(ArArea);
    //Show (vSharpenRtArea);
ImageMask(8);
//SelectFullScreen( );
//ClearScreen( );
//ArithmeticOp("Copy","Original",,,"Center",FALSE,
    FALSE);
//Pause ( );
}
//*********************************************
    **********************************
*********
//*********************************************
    **********************************
**********
define SobelArea( )Δ//Find root area using Sobel filter
{
SelectFullScreen( );
ClearScreen( );
ArithmeticOp("Copy","SeedROI",,,"Center",FALSE,
    FALSE);
CreateArea(vSeedROIOutline);
CMPLX_mAreasToMasks( );
Filters ( Sobel );
Filters ( SharpenHigh );
Threshold (vFilterTHR);
//GrayToBinary( );
//Threshold (vFilterTHR);
//DilateFilter(,1);
/*Δ0 1 2 3 4 5 6 7 8 9 10 11 12 13*/
AreaCNVFactors[0.13]=0.0:1.0:-1.0:64.0:1000.0:4.0:-
    1.0:-1.0:-1.0:0.0:255.0:-1.0:1.0:0.0;
CreateArea(,,TRUE);
DataCollectionType=2;
MultipleMode=TRUE;
MultipleExtract ( );
ROIToList (, "ARM_Original");
ARM_BitMap=BitMapCreate ( ,0,255,TRUE, 0);
BitMapProcess (ARM_BitMap,, 22 );
BitMapDelete (ARM_BitMap);
ArithmeticOp ("And", "ARM_Original");
DilateFilter(,1);
Threshold (vFilterTHR);
//Δ0 1 2 3 4 5 6 7 8 9 10 11 12 13
AreaCNVFactors[0.13]=0.0:1.0:-1.0:64.0:1000.0:4.0:-
    1.0:-1.0:-1.0:0.0:255.0:-1.0:1.0:0.0;
CreateArea (,,TRUE);
DataCollectionType=2;
MultipleMode=TRUE;
MultipleExtract ( );
ROIToList(,"Sobel");
vSobelArPoints=(mArPoints);
vSobelRtArea=(ArArea);
    //Show (vSobelRtArea);
ImageMask(8);
//SelectFullScreen( );
//ClearScreen( );
//ArithmeticOp("Copy","original",,,"Center",FALSE,
    FALSE);
//Pause ( );
}
//*********************************************
    **********************************
**********
//*********************************************
    **********************************
**********
define ThresholdArea( )Δ//Find root area using RGB
    Threshold
{
SelectFullScreen( );
ClearScreen( );
ArithmeticOp("Copy","SeedROI",,,"Center",FALSE,
    FALSE);
CreateArea(vSeedROIOutline);
CMPLX_mAreasToMasks( );
Threshold (vRootTHR);
GrayToBinary( );
Threshold (vFilterTHR);
DilateFilter(,1);
/*Δ0 1 2 3 4 5 6 7 8 9 10 11 12 13*/
AreaCNVFactors[0.13]=0.0:1.0:-1.0:64.0:1000.0:4.0:-
    1.0:-1.0:-1.0:0.0:255.0:-1.0:1.0:0.0;
CreateArea(,,TRUE);
DataCollectionType=2;
MultipleMode=TRUE;
MultipleExtract ( );
ROIToList (, "ARM_Original");
ARM_BitMap=BitMapCreate ( ,0,255,TRUE, 0);
BitMapProcess (ARM_BitMap,, 22 );
BitMapDelete (ARM_BitMap);
ArithmeticOp ("And", "ARM_Original");
DilateFilter(,1);
ROIToList(,"Threshold");
vThresholdArPoints=(mArPoints);
vThresholdRtArea=(ArArea);
    //Show (vThresholdRtArea);
ImageMask(8);
//SelectFullScreen( );
//ClearScreen( );
//ArithmeticOp("Copy","original",,,"Center",FALSE,
    FALSE);
//Pause ( );
}
//*********************************************
    **********************************
**********
//*********************************************
    **********************************
**********
define CombineArea( )Δ//Combine root areas from previous
    sections
{
SelectFullScreen( );
ClearScreen( );
CreateArea(vSeedROIOutline);
CMPLX_mAreasToMasks( );
ArithmeticOp("Copy","Sharpen Center",FALSE,FALSE);
ArithmeticOp("Add","Sobel",,,"Center",FALSE,FALSE);
ArithmeticOp("Add","Threshold",,,"Center",FALSF,
    FALSE);
Threshold (vFilterTHR);
DilateFilter(,1);
/*Δ0 1 2 3 4 5 6 7 8 9 10 11 12 13*/
AreaCNVFactors[0.13]=0.0:1.0:-1.0:64.0:1000.0:2.0:-
    1.0:-1.0:-1.0:0.0:255.0:-1.0:1.0:0.0;
```

```
CreateArea(,,TRUE);
DataCollectionType=2;
MultipleMode=TRUE;
MultipleExtract( );
hAreaHandles=GetScreenItemHandles(0x004);
    //Show (hAreaHandles,hAreaHandles);
ShowReferenceArea=TRUE; /* show the reference area */
CreateArea(vSeedAnchor,TRUE); /* user creates a new ref
    area */
//Extract( ); /* get the data object */
//ViewBox(ArReference); /* show results */
//CreateArea(vSeedAnchor);
//DataCollectionType=2;
//MultipleMode=TRUE;
//MultipleExtractAll (True);
//Classify( ); /* classify areas */
    //Show (vSeedAnchor);
//ROIToList(,"Combine");
vTotalArPoints=(mArPoints);
vTotalRtArea=(ArArea);
    Show (vTotalRtArea);
LineCNVFactors[0 . . . 5]=0.0:1.0:-1.0:64.0:1000.0:0.05;
CreateLine(,,TRUE);
DataCollectionType=1;
MultipleMode=TRUE;
MultipleExtract ( );
vRootPoints=(mLnPoints);
vRootLength=(mLnLength);
    //Show (vRootLength);
ShowReferenceArea=FALSE;
ImageMask(8);
SelectFullScreen( );
ClearScreen( );
ArithmeticOp("Copy","original",,,"Center",FALSE,
    FALSE);
//Pause ( );
}
//*********************************************
***********************************
**********
//*********************************************
***********************************
**********
define Measure( )Δ//Measure root length
{
ShowReferenceArea=FALSE;
ImageMask(8);
SelectFullScreen( );
ClearScreen( );
SeedAnchor( );
CreateSeedROI( );
SharpenHighArea( );
SobelArea( );
ThresholdArea( );
CombineArea( );
    //Show ("Total Root Length is: ",vRootLength);
Pause ( );
}
//***********************************************
***********************************
**********
vCentroid=(vCentroid 1);
ShowReferenceArea=FALSE;
ImageMask(8);
SelectFullScreen( );
ClearScreen( );
Measure( );
vRoot1=(vRootPoints);
vRootLength1=(vRootLength);
vCentroid=(vCentroid2);
ShowReferenceArea=FALSE;
ImageMask(8);
SelectFullScreen( );
ClearScreen( );
Measure( );
vRoot2=(vRootPoints);
vRootLength2=(vRootLength);
vCentroid=(vCentroid3);
ShowReferenceArea=FALSE;
ImageMask(8);
SelectFullScreen( );
ClearScreen( );
Measure( );
vRoot3=(vRootPoints);
vRootLength3=(vRootLength);
vCentroid=(vCentroid4);
Measure( );
vRoot4=(vRootPoints);
vRootLength4=(vRootLength);
vCentroid=(vCentroid5);
Measure( );
vRoot5=(vRootPoints);
vRootLength5=(vRootLength);
vCentroid=(vCentroid6);
Measure( );
vRoot6=(vRootPoints);
vRootLength6=(vRootLength);
vCentroid=(vCentroid7);
Measure( );
vRoot7=(vRootPoints);
vRootLength7=(vRootLength);
vCentroid=(vCentroid8);
Measure( );
vRoot8=(vRootPoints);
vRootLength8=(vRootLength);
vCentroid=(vCentroid9);
Measure( );
vRoot9=(vRootPoints);
vRootLength9=(vRootLength);
vCentroid=(vCentroid10);
Measure( );
vRoot10=(vRootPoints);
vRootLength10=(vRootLength);
vCentroid=(vCentroid11);
Measure( );
vRoot11=(vRootPoints);
vRootLength11=(vRootLength);
vCentroid=(vCentroid12);
Measure( );
vRoot12=(vRootPoints);
vRootLength12=(vRootLength);
vCentroid=(vCentroid13);
Measure( );
vRoot13=(vRootPoints);
vRootLength13=(vRootLength);
vCentroid=(vCentroid14);
Measure( );
vRoot14=(vRootPoints);
vRootLength14=(vRootLength);
vCentroid=(vCentroid15);
Measure( );
vRoot15=(vRootPoints);
vRootLength15=(vRootLength);
```

```
vCentroid=(vCentroid16);
Measure( );
vRoot16=(vRootPoints);
vRootLength16=(vRootLength);
vCentroid=(vCentroid17);
Measure( );
vRoot17=(vRootPoints);
vRootLength17=(vRootLength);
vCentroid=(vCentroid18);
Measure( );
vRoot18=(vRootPoints);
vRootLength18=(vRootLength);
vCentroid=(vCentroid19);
Measure( );
vRoot19=(vRootPoints);
vRootLength19=(vRootLength);
vCentroid=(vCentroid20);
Measure( );
vRoot20=(vRootPoints);
vRootLength20=(vRootLength);
delete (nSteps, pi, r, twopi, DeltaAngle, xy);
vRootPoints=(vRoot1);
vRootLength=vRootLength1;
If (vRootLength !=0);
  {
  CreateLine (vRootPoints);
  }
vRootPoints=(vRoot2);
vRootLength=vRootLength2;
If (vRootLength !=0);
  {
  CreateLine (vRootPoints);
  }
vRootPoints=(vRoot3);
vRootLength=vRootLength3;
If (vRootLength !=0);
  {
  CreateLine (vRootPoints);
  }
vRootPoints=(vRoot4);
vRootLength=vRootLength4;
If (vRootLength !=0);
  {
  CreateLine (vRootPoints);
  }
vRootPoints=(vRoot5);
vRootLength=vRootLength5;
If (vRootLength !=0);
  {
  CreateLine (vRootPoints);
  }
vRootPoints=(vRoot6);
vRootLength=vRootLength6;
If (vRootLength !=0);
  {
  CreateLine (vRootPoints);
  }
vRootPoints=(vRoot7);
vRootLength=vRootLength7;
If (vRootLength !=0);
  {
  CreateLine (vRootPoints);
  }
vRootPoints=(vRoot8);
vRootLength=vRootLength8;
If (vRootLength !=0);
  {
  CreateLine (vRootPoints);
  }
vRootPoints=(vRoot9);
vRootLength=vRootLength9;
If (vRootLength !=0);
  {
  CreateLine (vRootPoints);
  }
vRootPoints=(vRoot10);
vRootLength=vRootLength10;
If (vRootLength !=0);
  {
  CreateLine (vRootPoints);
  }
vRootPoints=(vRoot11);
vRootLength=vRootLength11;
If (vRootLength !=0);
  {
  CreateLine (vRootPoints);
  }
vRootPoints=(vRoot12);
vRootLength=vRootLength12;
If (vRootLength !=0);
  {
  CreateLine (vRootPoints);
  }
vRootPoints=(vRoot13);
vRootLength=vRootLength13;
If (vRootLength !=0);
  {
  CreateLine (vRootPoints);
  }
vRootPoints=(vRoot14);
vRootLength=vRootLength14;
If (vRootLength !=0);
  {
  CreateLine (vRootPoints);
  }
vRootPoints=(vRoot15);
vRootLength=vRootLength15;
If (vRootLength !=0);
  {
  CreateLine (vRootPoints);
  }
vRootPoints=(vRoot16);
vRootLength=vRootLength16;
If (vRootLength !=0);
  {
  CreateLine (vRootPoints);
  }
vRootPoints=(vRoot17);
vRootLength=vRootLength17;
If (vRootLength !=0);
  {
  CreateLine (vRootPoints);
  }
vRootPoints=(vRoot18);
```

```
vRootLength=vRootLength18;
If (vRootLength !=0);
{
    CreateLine (vRootPoints);
}
vRootPoints=(vRoot19);
vRootLength=vRootLength19;
If (vRootLength !=0);
{
    CreateLine (vRootPoints);
}
vRootPoints=(vRoot20);
vRootLength=vRootLength20;
If (vRootLength !=0);
{
    CreateLine (vRootPoints);
}
Pause ( );
ImageMask(8);
SelectFullScreen( );
ClearScreen( );
ArithmeticOp("Copy","Original",,,"Center",FALSE,
    FALSE);
```

In summary, the system and method of the present invention, preferably with an image device and image analyzer, and more preferably with a digital video camera and a computer with seedlot vigor analysis software operating therein is advantageous because it provides an efficient and economical method and system which accurately predicts seedlot vigor independent of germination environmental conditions.

The system and method of the present invention measures a parameter which correlates highly with the characteristic of interest. This invention employs an appropriate experimental design, including sample size and test replication in order to insure that test results match actual final stands obtained from normal commercial production. In a preferred embodiment, the parameter measured is root emergence and radicle growth and development. The combination of objective data collection together with a modified AOSA blotter paper test produces consistent, reliable and accurate results. These results can be presented in graphical format as was done in the Example herein, or can be otherwise conveyed in a manner to meet the needs of an individual customer.

The system and method of the present invention has the further advantage of reduced time requirements. The testing in the impatiens example described herein was completed in only eight days, which is about two to three times faster than plug tray tests. Further, the facilities and labor requirements are also significantly reduced with the present invention as compared with plug tray tests. Also, although the invention described checking for germination only once each day, in practice germination can be checked for as often as is necessary.

Although the present invention has been described in considerable detail with reference to certain preferred versions thereof, other versions are possible. For example, instead of using a machine, the present invention is also a basic non-machine implemented method of measuring the rate of root growth. The rate of root emergence and radicle growth and development for each seed which has been plated on the blotter paper can be observed and hand-measured, and a report regarding seedlot vigor can be generated manually. Furthermore, instead of using only one growth chamber, a series of growth chambers, each containing a rotating rack system, can be arranged so that one (1) large camera positioning system can be positioned above the row of growth chambers, allowing an increased number of seeds to be tested more efficiently. Therefore, the spirit and scope of the appended claims should not be limited to the description of the preferred embodiments contained herein.

What is claimed is:

1. A method for determining seedlot vigor comprising steps of:
    a) using a machine vision system to acquire and store an image of a root which has emerged from a seed, the seed and root located on wet blotter paper within a controlled environment, wherein the machine vision system comprises an imaging device and an image analyzer;
    b) acquiring and storing at least two additional images of the root at a time later than the first image to obtain a root growth path;
    c) measuring growth rate of the root by electronic image analysis of the stored images of the root growth path, wherein the image analyzer is a computer with a software component operating therein, further wherein the imaging device is coupled to the computer; and
    d) determining seedlot vigor based upon analysis of root growth rate, whereby faster and more uniform root emergence and growth indicate a more vigorous seedlot.

2. The method for determining seedlot vigor as recited in claim 1 wherein the images in steps (a) and (b) are acquired using a video camera or digital camera.

3. A method for determining seedlot vigor comprising the steps of:
    (a) plating one or more seeds on blotter paper which has been wetted with a suitable fluid;
    (b) placing the blotter paper on which one or more seeds are plated in a germination box;
    (c) placing the germination box in a growth chamber wherein environmental conditions are controlled;
    (d) capturing an image of an overall region of interest, the overall region of interest including the blotter paper on which one or more seeds are plated, and an area extending beyond the blotter paper, whereby the image can be used to provide a centered view of the overall region of interest;
    (e) capturing an image of a seed region of interest and a seed centroid within the seed region of interest, wherein the seed region of interest includes a region, wherein the region comprises a seed plated on the blotter paper;
    (f) checking periodically for an image in a database of a germinated seed, said checking comprising the steps of:
        (1) determining an initial germination region of interest within the seed region of interest, the initial germination region of interest centered on the seed centroid; and
        (2) locating and drawing a first new root length for a root which has emerged from the seed, wherein germination has occurred if a root touches the initial germination region of interest;
    (g) within a fixed period of time subsequent to a time in which germination has occurred, finding and saving an image to a database of the first new root length and a first new root endpoint comprising the steps of:
        (1) determining a first measurement region of interest which is centered on the seed centroid;
        (2) encompassing in the first measurement region of interest the first new root endpoint; and (3) locating and drawing the first new root length and first new root endpoint, wherein the first new root length is a distance from the seed centroid to the first new root endpoint;

(h) at times subsequent to the time germination has occurred, finding and saving an image to the database of a subsequent new root length and a subsequent new root endpoint comprising the steps of:

(1) determining successive measurement region of interests within the seed region of interest which is centered on root endpoint from the previous time period;

(2) encompassing in each successive measurement region of interest a subsequent new root endpoint which is the root endpoint for the time on which the subsequent measurement region of interest is determined; and (3) locating and drawing a subsequent new root length and subsequent new root endpoint wherein the subsequent new root length is the root length from a current time period added to the root length from all time periods immediately preceding the current time period; and (i) determining seedlot vigor of each seed based upon analysis of root length information in the database, whereby faster and more uniform root emergence and growth indicate a more vigorous seedlot.

4. The method for determining seedlot vigor as recited in claim 3 wherein the blotter paper test in step (a) is performed according to AOSA standards.

5. The method for determining seedlot vigor as recited in claim 3 wherein less than the AOSA standard number of seeds prescribed are plated on the blotter paper.

6. The method of determining seedlot vigor as recited in claim 3 further including:

(a) flagging data in the database with a flag when a first new root length, subsequent new root length, first new root endpoint or subsequent root endpoint is outside of an expected range; and (b) resetting the flag by manually drawing a line on the image corresponding to the correct root position such that the corrected data is entered in the database or manually removing data from the database which can not be corrected.

7. The method of determining seedlot vigor as recited in claim 3 wherein the images of the germinated seed in step (f) and the first new root length in step (g) and the subsequent new root length and subsequent new root endpoint in step (h) are checked each day, wherein the subsequent new root length is the root length from a current day added to the root length from all days immediately preceding the current day.

* * * * *

UNITED STATES PATENT AND TRADEMARK OFFICE
CERTIFICATE OF CORRECTION

PATENT NO.: 5,864,984
DATED: 2/02/99
INVENTOR(S): McNertney

It is certified that errors appear in the above-identified patent and that said patent is hereby corrected as shown below:

In column 16, line 66, delete "∆".
In column 17, line 7, delete "∆".
In column 18, line 34, delete "∆".
In column 19, line 38, delete "∆".
In column 19, line 60, delete "∆".
In column 24, line 54, delete "∆".
In column 25, line 38, delete "∆".
In column 25, line 52, delete "∆".
In column 26, line 22, delete "∆".
In column 26, line 65, delete "∆".
In column 34, lines 16 and 17, delete "can not" and insert --cannot--, therefore.

Signed and Sealed this

Twenty-third Day of May, 2000

Attest:

Q. TODD DICKINSON

*Attesting Officer*          *Director of Patents and Trademarks*